(12) United States Patent
Alfandary et al.

(10) Patent No.: US 8,402,426 B2
(45) Date of Patent: Mar. 19, 2013

(54) ARCHITECTURAL DESIGN FOR MAKE TO STOCK APPLICATION SOFTWARE

(75) Inventors: Shai Alfandary, Zur Moshe (IL); Reiner Bildmayer, Bad Schoenborn (DE); Achim Clemens, Spayer (DE); Andre Doerfler, Mannheim (DE); Tim Gaiser, Sinsheim (DE); Stephan Hetzer, Oestingen-Eicheiberg (DE); Ami Heitner, Kfar-Sava (IL); Jochen Hirth, Birkenau (DE); Thorsten Kulick, Bensheim-Schoenberg (DE); Andreas Poth, Weingarten (DE); Andreas Sandner, Altiussheim (DE); Jochen Steinbach, Bad Schoenborn (DE); Martin J Wilmes, Ottersheim (DE); Jens Freund, Heidelberg (DE); Stefan Kaetker, Dossenheim (DE); Gerd Moosmann, Pforzheim (DE); Peter Latocha, Malsch (DE)

(73) Assignee: SAP AG, Walldorf (DE)

( * ) Notice: Subject to any disclaimer, the term of this patent is extended or adjusted under 35 U.S.C. 154(b) by 1812 days.

(21) Appl. No.: 11/322,482

(22) Filed: Dec. 30, 2005

(65) Prior Publication Data

US 2007/0168240 A1 Jul. 19, 2007

(51) Int. Cl.
*G06F 9/45* (2006.01)
(52) U.S. Cl. ...................................... 717/102
(58) Field of Classification Search .................. 717/102
See application file for complete search history.

(56) References Cited

U.S. PATENT DOCUMENTS

| 4,947,321 A | 8/1990 | Spence et al. |
| 5,361,198 A | 11/1994 | Harmon et al. |
| 5,550,734 A | 8/1996 | Tarter et al. |
| 5,560,005 A | 9/1996 | Hoover et al. |
| 5,566,097 A | 10/1996 | Myers et al. |

(Continued)

FOREIGN PATENT DOCUMENTS

| WO | 2000/023874 | 4/2000 |
| WO | WO 2004/083984 | 9/2004 |

(Continued)

OTHER PUBLICATIONS

OSS-J Architecture Board: "Oss Through Java (TM) J2EE Design Guidelines", [online] Oct. 31, 2001 [retrieved on Apr. 20, 2005]. Retrieved from the Internet: <URL:http://www.ossj.org/downloads/design_guidelines.shtml>.

(Continued)

*Primary Examiner* — John Chavis
(74) *Attorney, Agent, or Firm* — Fish & Richardson P.C.

(57) ABSTRACT

Methods, systems, and apparatus, including computer program products, for implementing a software architecture design for a software application implementing a make to stock process. The application is structured as multiple process components interacting with each other through service interfaces, and multiple service interface operations, each being implemented for a respective process component. The process components include an Accounting process component; a Production process component; a Site Logistics process component; a Confirmation and Inventory process component; a Customer Requirement Processing process component; a Demand Forecast Processing process component; a Supply and Demand Matching process component; a Production Trigger and Response process component; an In-house Requirement Processing process component; a Sales Scheduling Agreement Processing process component; and a Demand Planning process component.

19 Claims, 6 Drawing Sheets

U.S. PATENT DOCUMENTS

| | | | |
|---|---|---|---|
| 5,586,312 A | 12/1996 | Johnson et al. | |
| 5,590,277 A | 12/1996 | Fuchs et al. | |
| 5,632,022 A | 5/1997 | Warren et al. | |
| 5,634,127 A | 5/1997 | Cloud et al. | |
| 5,680,619 A | 10/1997 | Gudmundson et al. | |
| 5,704,044 A | 12/1997 | Tarter et al. | |
| 5,710,917 A | 1/1998 | Musa et al. | |
| 5,768,119 A | 6/1998 | Havekost et al. | |
| 5,819,232 A * | 10/1998 | Shipman | 705/7.24 |
| 5,822,585 A | 10/1998 | Noble et al. | |
| 5,832,218 A | 11/1998 | Gibbs et al. | |
| 5,848,291 A | 12/1998 | Milne et al. | |
| 5,867,495 A | 2/1999 | Elliott et al. | |
| 5,870,588 A | 2/1999 | Rompaey et al. | |
| 5,881,230 A | 3/1999 | Christensen et al. | |
| 5,893,106 A | 4/1999 | Brobst et al. | |
| 5,898,872 A | 4/1999 | Richley | |
| 5,918,219 A | 6/1999 | Isherwood | |
| 5,987,247 A | 11/1999 | Lau | |
| 5,991,536 A | 11/1999 | Brodsky et al. | |
| H1830 H | 1/2000 | Petrimoulx et al. | |
| 6,028,997 A | 2/2000 | Leymann et al. | |
| 6,038,393 A | 3/2000 | Iyengar et al. | |
| 6,049,838 A | 4/2000 | Miller et al. | |
| 6,067,559 A | 5/2000 | Allard et al. | |
| 6,070,197 A | 5/2000 | Cobb et al. | |
| 6,112,024 A | 8/2000 | Almond et al. | |
| 6,151,582 A | 11/2000 | Huang et al. | |
| 6,167,563 A | 12/2000 | Fontana et al. | |
| 6,167,564 A | 12/2000 | Fontana et al. | |
| 6,177,932 B1 | 1/2001 | Galdes et al. | |
| 6,182,133 B1 | 1/2001 | Horvitz | |
| 6,192,390 B1 | 2/2001 | Berger et al. | |
| 6,208,345 B1 | 3/2001 | Sheard et al. | |
| 6,237,136 B1 | 5/2001 | Sadahiro | |
| 6,256,773 B1 | 7/2001 | Bowman-Amuah | |
| 6,272,672 B1 | 8/2001 | Conway | |
| 6,289,502 B1 | 9/2001 | Garland et al. | |
| 6,311,170 B1 | 10/2001 | Embrey | |
| 6,338,097 B1 | 1/2002 | Krenzke et al. | |
| 6,424,991 B1 | 7/2002 | Gish | |
| 6,434,740 B1 | 8/2002 | Monday et al. | |
| 6,442,748 B1 | 8/2002 | Bowman-Amuah | |
| 6,445,782 B1 | 9/2002 | Elfe et al. | |
| 6,446,045 B1 | 9/2002 | Stone et al. | |
| 6,446,092 B1 | 9/2002 | Sutter | |
| 6,473,794 B1 | 10/2002 | Guheen et al. | |
| 6,493,716 B1 | 12/2002 | Azagury et al. | |
| 6,571,220 B1 | 5/2003 | Ogino et al. | |
| 6,594,535 B1 * | 7/2003 | Costanza | 700/97 |
| 6,601,233 B1 | 7/2003 | Underwood | |
| 6,601,234 B1 | 7/2003 | Bowman-Amuah | |
| 6,606,744 B1 | 8/2003 | Mikurak | |
| 6,609,100 B2 | 8/2003 | Smith et al. | |
| 6,640,238 B1 | 10/2003 | Bowman-Amuah | |
| 6,671,673 B1 | 12/2003 | Baseman et al. | |
| 6,678,882 B1 | 1/2004 | Hurley et al. | |
| 6,687,734 B1 | 2/2004 | Sellink et al. | |
| 6,691,151 B1 | 2/2004 | Cheyer et al. | |
| 6,721,783 B1 | 4/2004 | Blossman et al. | |
| 6,738,964 B1 | 5/2004 | Zink et al. | |
| 6,747,679 B1 | 6/2004 | Finch et al. | |
| 6,750,885 B1 | 6/2004 | Finch et al. | |
| 6,757,837 B1 | 6/2004 | Platt et al. | |
| 6,764,009 B2 | 7/2004 | Melick et al. | |
| 6,772,216 B1 | 8/2004 | Ankireddipally et al. | |
| 6,782,536 B2 | 8/2004 | Moore et al. | |
| 6,789,252 B1 | 9/2004 | Burke et al. | |
| 6,845,499 B2 | 1/2005 | Srivastava et al. | |
| 6,847,854 B2 * | 1/2005 | Discenzo | 700/99 |
| 6,859,931 B1 | 2/2005 | Cheyer et al. | |
| 6,889,197 B2 | 5/2005 | Lidow | |
| 6,889,375 B1 | 5/2005 | Chan et al. | |
| 6,895,438 B1 | 5/2005 | Ulrich | |
| 6,898,783 B1 | 5/2005 | Gupta et al. | |
| 6,904,399 B2 | 6/2005 | Cooper et al. | |
| 6,907,395 B1 | 6/2005 | Hunt et al. | |
| 6,925,447 B2 * | 8/2005 | McMenimen et al. | 705/28 |
| 6,950,802 B1 | 9/2005 | Barnes et al. | |
| 6,954,736 B2 | 10/2005 | Menninger et al. | |
| 6,985,939 B2 | 1/2006 | Fletcher et al. | |
| 6,990,466 B1 | 1/2006 | Hu | |
| 7,003,474 B2 | 2/2006 | Lidow | |
| 7,031,998 B2 | 4/2006 | Archbold | |
| 7,043,448 B2 | 5/2006 | Campbell | |
| 7,047,518 B2 | 5/2006 | Little et al. | |
| 7,050,056 B2 | 5/2006 | Meyringer | |
| 7,050,873 B1 * | 5/2006 | Discenzo | 700/99 |
| 7,051,071 B2 | 5/2006 | Stewart et al. | |
| 7,055,136 B2 | 5/2006 | Dzoba et al. | |
| 7,058,587 B1 * | 6/2006 | Horne | 705/7 |
| 7,069,536 B2 | 6/2006 | Yaung | |
| 7,072,855 B1 | 7/2006 | Godlewski et al. | |
| 7,076,762 B2 | 7/2006 | Fisher | |
| 7,076,766 B2 | 7/2006 | Wirts et al. | |
| 7,100,195 B1 | 8/2006 | Underwood | |
| 7,103,873 B2 | 9/2006 | Tanner et al. | |
| 7,117,447 B2 | 10/2006 | Cobb et al. | |
| 7,120,597 B1 | 10/2006 | Knudtzon et al. | |
| 7,120,896 B2 | 10/2006 | Budhiraja et al. | |
| 7,130,807 B1 | 10/2006 | Mikurak | |
| 7,131,069 B1 | 10/2006 | Rush et al. | |
| 7,149,887 B2 | 12/2006 | Morrison et al. | |
| 7,155,403 B2 | 12/2006 | Cirulli et al. | |
| 7,155,409 B1 | 12/2006 | Stroh | |
| 7,181,694 B2 | 2/2007 | Reiss et al. | |
| 7,184,964 B2 | 2/2007 | Wang | |
| 7,194,431 B1 | 3/2007 | Land et al. | |
| 7,197,740 B2 | 3/2007 | Beringer et al. | |
| 7,200,569 B2 | 4/2007 | Gallagher et al. | |
| 7,206,768 B1 | 4/2007 | deGroeve et al. | |
| 7,213,232 B1 | 5/2007 | Knowles | |
| 7,216,091 B1 | 5/2007 | Blandina et al. | |
| 7,219,107 B2 | 5/2007 | Beringer | |
| 7,222,786 B2 | 5/2007 | Renz et al. | |
| 7,225,240 B1 | 5/2007 | Fox et al. | |
| 7,249,044 B2 | 7/2007 | Kumar et al. | |
| 7,257,254 B2 | 8/2007 | Tunney | |
| 7,280,955 B2 | 10/2007 | Martin | |
| 7,283,973 B1 | 10/2007 | Loghmani et al. | |
| 7,293,254 B2 | 11/2007 | Bloesch et al. | |
| 7,299,970 B1 | 11/2007 | Ching | |
| 7,315,830 B1 | 1/2008 | Wirtz et al. | |
| 7,322,024 B2 | 1/2008 | Carlson et al. | |
| 7,324,966 B2 | 1/2008 | Scheer | |
| 7,353,180 B1 | 4/2008 | Silverstone et al. | |
| 7,356,492 B2 | 4/2008 | Hazi et al. | |
| 7,367,011 B2 | 4/2008 | Ramsey et al. | |
| 7,370,315 B1 | 5/2008 | Lovell et al. | |
| 7,376,601 B1 | 5/2008 | Aldridge | |
| 7,376,604 B1 | 5/2008 | Butcher | |
| 7,376,632 B1 | 5/2008 | Sadek et al. | |
| 7,383,201 B2 | 6/2008 | Matsuzaki et al. | |
| 7,386,833 B2 | 6/2008 | Granny et al. | |
| 7,401,334 B2 | 7/2008 | Fussell | |
| 7,406,716 B2 * | 7/2008 | Kanamori et al. | 726/28 |
| 7,415,697 B1 | 8/2008 | Houlding | |
| 7,418,409 B1 | 8/2008 | Goel | |
| 7,418,424 B2 | 8/2008 | Martin et al. | |
| 7,424,701 B2 | 9/2008 | Kendall et al. | |
| 7,433,979 B2 | 10/2008 | Need | |
| 7,448,022 B1 | 11/2008 | Ram et al. | |
| 7,451,432 B2 | 11/2008 | Shukla et al. | |
| 7,460,654 B1 | 12/2008 | Jenkins et al. | |
| 7,461,030 B2 | 12/2008 | Hibler et al. | |
| 7,469,233 B2 | 12/2008 | Shooks et al. | |
| 7,493,594 B2 | 2/2009 | Shenfield et al. | |
| 7,499,766 B2 * | 3/2009 | Knight et al. | 700/107 |
| 7,516,088 B2 | 4/2009 | Johnson et al. | |
| 7,523,054 B2 | 4/2009 | Tyson-Quah | |
| 7,529,699 B2 | 5/2009 | Fuse et al. | |
| 7,536,325 B2 | 5/2009 | Randell et al. | |
| 7,536,354 B1 | 5/2009 | deGroeve et al. | |
| 7,546,520 B2 | 6/2009 | Davidson et al. | |
| 7,546,575 B1 | 6/2009 | Dillman et al. | |
| 7,565,640 B2 | 7/2009 | Shukla et al. | |
| 7,574,694 B2 | 8/2009 | Mangan et al. | |

| | | |
|---|---|---|
| 7,624,371 B2 | 11/2009 | Kulkarni et al. |
| 7,631,291 B2 | 12/2009 | Shukla et al. |
| 7,640,195 B2 | 12/2009 | Von Zimmermann et al. |
| 7,640,291 B2 | 12/2009 | Maturana et al. |
| 7,644,390 B2 | 1/2010 | Khodabandehloo et al. |
| 7,653,898 B1 | 1/2010 | Ali et al. |
| 7,657,406 B2 | 2/2010 | Tolone et al. |
| 7,657,445 B1 | 2/2010 | Goux |
| 7,665,083 B2 | 2/2010 | Demant et al. |
| 7,668,761 B2 | 2/2010 | Jenkins et al. |
| 7,672,888 B2 | 3/2010 | Allin et al. |
| 7,676,786 B2 | 3/2010 | Shenfield et al. |
| 7,681,176 B2 | 3/2010 | Wills et al. |
| 7,693,586 B2 | 4/2010 | Dumas et al. |
| 7,703,073 B2 | 4/2010 | Illowsky et al. |
| 7,739,160 B1 | 6/2010 | Ryan et al. |
| 7,742,985 B1 | 6/2010 | Digrigoli et al. |
| 7,747,980 B2 | 6/2010 | Illowsky et al. |
| 7,765,156 B2 | 7/2010 | Staniar et al. |
| 7,765,521 B2 | 7/2010 | Bryant |
| 7,784,025 B2 | 8/2010 | Challapalli et al. |
| 7,788,145 B2 | 8/2010 | Wadawadigi et al. |
| 7,788,319 B2 | 8/2010 | Schmidt et al. |
| 7,793,256 B2 | 9/2010 | Charisius et al. |
| 7,793,258 B2 | 9/2010 | Sundararajan et al. |
| 7,797,698 B2 | 9/2010 | Diament et al. |
| 7,805,365 B1 | 9/2010 | Slavin et al. |
| 7,814,142 B2 | 10/2010 | Mamou et al. |
| 7,822,682 B2 | 10/2010 | Arnold et al. |
| 7,835,971 B2 | 11/2010 | Stockton et al. |
| 7,886,041 B2 | 2/2011 | Outhred et al. |
| 7,895,568 B1 | 2/2011 | Goodwin et al. |
| 7,904,350 B2 | 3/2011 | Ayala et al. |
| 7,912,755 B2 | 3/2011 | Perry et al. |
| 7,917,889 B2 | 3/2011 | Devarakonda et al. |
| 7,925,985 B2 | 4/2011 | Moore |
| 8,001,519 B2 | 8/2011 | Conallen et al. |
| 8,006,224 B2 | 8/2011 | Bateman et al. |
| 8,010,938 B2 | 8/2011 | Elaasar |
| 8,051,332 B2 | 11/2011 | Zakonov et al. |
| 8,078,485 B1 | 12/2011 | Kraehmueller et al. |
| 8,086,995 B2 | 12/2011 | Luo et al. |
| 8,091,065 B2 | 1/2012 | Mir et al. |
| 8,112,738 B2 | 2/2012 | Pohl et al. |
| 8,140,455 B2 | 3/2012 | Hutson et al. |
| 2001/0052108 A1 | 12/2001 | Bowman-Amuah |
| 2002/0007293 A1* | 1/2002 | Clemens et al. .................. 705/7 |
| 2002/0010563 A1* | 1/2002 | Ratteree et al. .................. 703/2 |
| 2002/0026394 A1 | 2/2002 | Savage et al. |
| 2002/0042756 A1 | 4/2002 | Kumar et al. |
| 2002/0049622 A1 | 4/2002 | Lettich et al. |
| 2002/0069144 A1 | 6/2002 | Palardy |
| 2002/0073114 A1 | 6/2002 | Nicastro et al. |
| 2002/0073396 A1 | 6/2002 | Crupi et al. |
| 2002/0078046 A1 | 6/2002 | Uluakar et al. |
| 2002/0082892 A1 | 6/2002 | Raffel et al. |
| 2002/0095650 A1 | 7/2002 | Green et al. |
| 2002/0100014 A1 | 7/2002 | Iborra et al. |
| 2002/0103660 A1 | 8/2002 | Cramon et al. |
| 2002/0104071 A1 | 8/2002 | Charisius et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 | 10/2002 | Scheer |
| 2002/0156695 A1 | 10/2002 | Edwards |
| 2002/0161907 A1 | 10/2002 | Moon |
| 2002/0165745 A1 | 11/2002 | Greene et al. |
| 2002/0184111 A1 | 12/2002 | Swanson |
| 2002/0188486 A1 | 12/2002 | Gil et al. |
| 2002/0198798 A1 | 12/2002 | Ludwig et al. |
| 2002/0198828 A1 | 12/2002 | Ludwig et al. |
| 2003/0009754 A1 | 1/2003 | Rowley et al. |
| 2003/0061123 A1* | 3/2003 | McMenimen et al. .......... 705/28 |
| 2003/0069774 A1 | 4/2003 | Hoffman et al. |
| 2003/0074271 A1 | 4/2003 | Viswanath et al. |
| 2003/0074360 A1 | 4/2003 | Chen et al. |
| 2003/0083762 A1* | 5/2003 | Farrah et al. .................. 700/97 |
| 2003/0084127 A1 | 5/2003 | Budhiraja et al. |
| 2003/0101112 A1 | 5/2003 | Gallagher et al. |
| 2003/0109950 A1* | 6/2003 | Andrade et al. ............... 700/103 |
| 2003/0130860 A1 | 7/2003 | Datta et al. |
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0054564 A1 | 3/2004 | Fonseca et al. |
| 2004/0093268 A1 | 5/2004 | Ramchandani et al. |
| 2004/0093381 A1 | 5/2004 | Hodges et al. |
| 2004/0111304 A1 | 6/2004 | Meka et al. |
| 2004/0111639 A1 | 6/2004 | Schwartz et al. |
| 2004/0128180 A1 | 7/2004 | Abel et al. |
| 2004/0133481 A1 | 7/2004 | Schwarze et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0177342 A1 | 9/2004 | Worley, Jr. |
| 2004/0181470 A1 | 9/2004 | Grounds |
| 2004/0181538 A1 | 9/2004 | Lo et al. |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1* | 12/2004 | Kanamori et al. ............. 713/201 |
| 2005/0010501 A1 | 1/2005 | Ward, Jr. |
| 2005/0022160 A1 | 1/2005 | Uluakar et al. |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0065863 A1* | 3/2005 | Plumer et al. .................... 705/30 |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0156500 A1 | 7/2005 | Birecki et al. |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0216507 A1 | 9/2005 | Wright |
| 2005/0222896 A1 | 10/2005 | Rhyne et al. |
| 2005/0234787 A1 | 10/2005 | Wallmeier et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0257197 A1 | 11/2005 | Herter et al. |
| 2005/0262192 A1 | 11/2005 | Mamou et al. |
| 2005/0262453 A1 | 11/2005 | Massasso |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |

| | | |
|---|---|---|
| 2006/0129978 A1 | 6/2006 | Abrari et al. |
| 2006/0143029 A1 | 6/2006 | Akbay et al. |
| 2006/0149574 A1 | 7/2006 | Bradley et al. |
| 2006/0206352 A1 | 9/2006 | Pulianda |
| 2006/0248504 A1* | 11/2006 | Hughes .......................... 717/101 |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0022410 A1 | 1/2007 | Ban et al. |
| 2007/0050308 A1 | 3/2007 | Latvala et al. |
| 2007/0074150 A1 | 3/2007 | Jolfaei et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0143164 A1 | 6/2007 | Kaila et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156428 A1 | 7/2007 | Brecht-Tillinger et al. |
| 2007/0156430 A1 | 7/2007 | Kaetker et al. |
| 2007/0156474 A1 | 7/2007 | Scherberger et al. |
| 2007/0156475 A1 | 7/2007 | Berger et al. |
| 2007/0156476 A1* | 7/2007 | Koegler et al. .................... 705/7 |
| 2007/0156482 A1 | 7/2007 | Bagheri |
| 2007/0156489 A1 | 7/2007 | Berger et al. |
| 2007/0156493 A1 | 7/2007 | Tebbe et al. |
| 2007/0156499 A1* | 7/2007 | Berger et al. .................... 705/9 |
| 2007/0156500 A1 | 7/2007 | Merkel et al. |
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1 | 7/2007 | Moosmann et al. |
| 2007/0164849 A1 | 7/2007 | Haeberle et al. |
| 2007/0168303 A1 | 7/2007 | Moosmann et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0197877 A1 | 8/2007 | Decorte et al. |
| 2007/0198391 A1 | 8/2007 | Dreyer et al. |
| 2007/0214065 A1 | 9/2007 | Kahlon et al. |
| 2007/0220046 A1 | 9/2007 | Moosmann et al. |
| 2007/0220143 A1 | 9/2007 | Lund et al. |
| 2007/0233539 A1 | 10/2007 | Suenderhauf et al. |
| 2007/0233541 A1 | 10/2007 | Schorr et al. |
| 2007/0233545 A1 | 10/2007 | Cala et al. |
| 2007/0233574 A1 | 10/2007 | Koegler et al. |
| 2007/0233575 A1 | 10/2007 | Berger et al. |
| 2007/0233581 A1 | 10/2007 | Peter |
| 2007/0233598 A1 | 10/2007 | Der Emde et al. |
| 2007/0234282 A1 | 10/2007 | Prigge et al. |
| 2007/0239508 A1 | 10/2007 | Fazal et al. |
| 2007/0239569 A1 | 10/2007 | Lucas et al. |
| 2007/0265860 A1 | 11/2007 | Herrmann et al. |
| 2007/0265862 A1 | 11/2007 | Freund et al. |
| 2008/0004929 A9 | 1/2008 | Raffel et al. |
| 2008/0010049 A1 | 1/2008 | Pouchak et al. |
| 2008/0017722 A1 | 1/2008 | Snyder et al. |
| 2008/0027831 A1 | 1/2008 | Gerhardt |
| 2008/0065437 A1 | 3/2008 | Dybvig |
| 2008/0120129 A1 | 5/2008 | Seubert et al. |
| 2008/0147507 A1 | 6/2008 | Langhammer |
| 2008/0162382 A1 | 7/2008 | Clayton et al. |
| 2008/0208707 A1 | 8/2008 | Erbey et al. |
| 2008/0215354 A1 | 9/2008 | Halverson et al. |
| 2008/0263152 A1 | 10/2008 | Daniels et al. |
| 2008/0300959 A1 | 12/2008 | Sinha et al. |
| 2009/0037287 A1 | 2/2009 | Baitalmal et al. |
| 2009/0037492 A1 | 2/2009 | Baitalmal et al. |
| 2009/0063112 A1 | 3/2009 | Hader et al. |
| 2009/0171716 A1 | 7/2009 | Suenderhauf et al. |
| 2009/0171818 A1 | 7/2009 | Penning et al. |
| 2009/0172699 A1 | 7/2009 | Jungkind et al. |
| 2009/0189743 A1 | 7/2009 | Abraham et al. |
| 2009/0192858 A1 | 7/2009 | Johnson |
| 2010/0070324 A1 | 3/2010 | Bock et al. |
| 2010/0070331 A1 | 3/2010 | Koegler et al. |
| 2010/0070336 A1 | 3/2010 | Koegler et al. |
| 2010/0070391 A1 | 3/2010 | Storr et al. |
| 2010/0070395 A1 | 3/2010 | Elkeles et al. |
| 2010/0070555 A1 | 3/2010 | Duparc et al. |
| 2010/0100464 A1 | 4/2010 | Ellis et al. |
| 2010/0138269 A1 | 6/2010 | Cirpus et al. |
| 2011/0252395 A1 | 10/2011 | Charisius et al. |

FOREIGN PATENT DOCUMENTS

| | | |
|---|---|---|
| WO | WO 2005/114381 | 12/2005 |

OTHER PUBLICATIONS

SAP AG, International Search Report and the Written Opinion of PCT Application No. PCT/EP2006/012614 filed Dec. 29, 2006.

Singh, I. et al., "Designing Enterprise Applications with the J2EE Platform, Second Edition", *Designing Enterprise Application with J2EE Platform*, (Jun. 15, 2002).

Thomas, A., "Enterprise JavaBeans Server Component Model for Java", 27 pages [online] Dec. 1997 [retrieved on Sep. 22, 2006]. Retrieved from the Internet: <URL:http://www.cs.indiana.edu/classes/b649-gann/ejb-white-paper.pdf>.

Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.

Arch-int, S. et al.; "Development of Industrial Information Systems on the Web Using Busienss Components"; Computers in Industry; vol. 60; 2003; pp. 231-250.

Astudillo, H.; "How Conceptual System Architecture Leads to Business Process"; ACM; 2000; pp. 35-36.

Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.

Cowan, D.D. et al.; "Application Integration: Constructing Composite Applications from Interactive Components"; Software Practice and Experience; bol. 23, No. 3; Mar. 1993; pp. 255-275.

Deimel, A.; "The SAP R/3 Business Framework"; Software—Concepts & Tools; vol. 19, No. 1; 1998; pp. 29-36.

Fellner, K.J., et al.; "Classification Framework for Business Components"; System Sciences; Proceedings of the 33rd Annual Hawaii International Conference; Jan. 2000; pp. 3239-3248.

Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.

Gessford, J.E.; "Object-Oriented System Design"; Emerging Information Technologies for Competitive Advantage and Economic Development; Proceedings of the 1992 Information Resources Management Association International Conference; 1992; pp. 110-118.

He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.

Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

Kythe, D.K.; "The Promise of Distributed Business Components"; Bell Labs Technical Journal; vol. 75, No. 2; Mar./Apr. 1999; pp. 20-28.

Linthicum, D.S.; "Chapter 9: RPCs, Messaging, and B2B Application Integration"; B2B Application Integration: E-Business Enable Your Enterprise; 2001; pp. 167-181.

Nori A.K. et al.; "Composite Applications: Process Based Application Development"; Lecture Notes in Computer Science; vol. 2444; Aug. 2003; pp. 48-53.

Pilhofer, F.; "Writing and Using CORBA Components"; Apr. 2002; http://www.fpx.de/MicoCCM/download/mico-ccm.pdf; 17 pages.

Ravichandran, T.; "Special Issue on Component-Based Software Development";The Data Base for Advances in Information Systems; 2003; pp. 45-46.

SAP AG; "Designing Cross Solutions"; SAP XAPPS, [online]; Sep. 2003; pp. 1-2; http://www.sap.com/belux/platform/netweaver/pdf/BWP_CAF.pdf.

Schmid, H.A.; "Business Entity Components and Buisness Process Components"; Joop; vol. 12, No. 6; Oct. 1999; pp. 6-10, 12-15.

Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.

Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.

Vergil Technology Ltd.; "Vergil Composite Application Builder Suite"; Product Datasheet [online]; 2003; pp. 1-5; http://www.webservicesmall.com.docs/VCAB_datasheet.pdf.

Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.

International Search Report and Written Opinion of the International Searching Authority issued in International Application No. PCT/EP2006/012625; Apr. 3, 2007; 8 pages.

International Preliminary Report on Patentability issued in International Application No. PCT/EP2006/012625; Jul. 1, 2008; 7 pages.

International Preliminary Report on Patentability issued in International Application No. PCT/US2006/012614; Jul. 1, 2008; 6 pages.

International Search Report and Written Opinion of the International Searching Authority issued in International Application No. PCT/EP2006/012618; Apr. 3, 2007; 8 pages.

International Preliminary Report on Patentability issued in International Application No. PCT/EP2006/012618; Jul. 1, 2008; 7 pages.

International Search Report and Written Opinion of the International Searching Authority issued in International Application No. PCT/EP2006/012613; May 3, 2007; 6 pages.

International Preliminary Report on Patentability issued in International Application No. PCT/EP2006/012613; Jul. 1, 2008; 6 pages.

International Search Report and Written Opinion of the International Searching Authority issued in International Application No. PCT/EP2006/012624; Mar. 30, 2007; 9 pages.

International Preliminary Report on Patentability issued in International Application No. PCT/EP2006/012624; Jul. 1, 2008; 8 pages.

International Search Report and Written Opinion of the International Searching Authority issued in International Application No. PCT/EP2006/012623; May 7, 2007; 8 pages.

International Preliminary Report on Patentability issued in International Application No. PCT/EP2006/012623; Jul. 1, 2008; 7 pages.

International Search Report and Written Opinion of the International Searching Authority issued in International Application No. PCT/EP2006/012620; Mar. 21, 2007; 7 pages.

International Preliminary Report on Patentability issued in International Application No. PCT/EP2006/012620; Jul. 1, 2008; 6 pages.

International Search Report and Written Opinion of the International Searching Authority issued in International Application No. PCT/EP2006/012619; Apr. 19, 2007; 8 pages.

International Preliminary Report on Patentability issued in International Application No. PCT/EP2006/012619; Jul. 1, 2008; 7 pages.

International Search Report and Written Opinion of the International Searching Authority issued in International Application No. PCT/EP2006/012621; Apr. 19, 2007; 8 pages.

International Preliminary Report on Patentability issued in International Application No. PCT/EP2006/012621; Jul. 1, 2008; 7 pages.

International Search Report and Written Opinion of the International Searching Authority issued in International Application No. PCT/EP2007/002835; Aug. 9, 2007; 12 pages.

International Preliminary Report on Patentability issued in International Application No. PCT/EP2007/002835; Sep. 30, 2008; 8 pages.

Communication Pursuant to Article 94(3) EPC issued in European Application No. 06841224.6; May 15, 2009; 8 pages.

Communication Pursuant to Article 94(3) EPC issued in European Application No. 06847009.5; May 15, 2009; 10 pages.

Communication Pursuant to Article 94(3) EPC issued in European Application No. 07007130.3; Dec. 5, 2008; 6 pages.

Extended European Search Report issued in European Application No. 07007130.3; Oct. 5, 2007; 6 pages.

Office Action issued in U.S. Appl. No. 11/323,041, filed Apr. 30, 2009; 26 pages.

Office Action issued in U.S. Appl. No. 11/322,612, filed May 11, 2009; 24 pages.

Office Action issued in U.S. Appl. No. 11/322,772, filed Mar. 25, 2009; 12 pages.

Office Action issued in U.S. Appl. No. 11/323,590, filed Jan. 9, 2009; 23 pages.

Office Action issued in U.S. Appl. No. 11/396,288, filed Jan. 2, 2009; 18 pages.

Office Action issued in U.S. Appl. No. 11/396,288, filed Apr. 15, 2008; 26 pages.

Anon,; "Sequnest Corp Bell Atlantic: Bell Atlantic Selects Sequent for Video-on-Demand Program; Sequent Moves to Sieze Opportunity in New Market"; Business Wire; Dec. 6, 1994, 2 pages.

Anon.; "State of the Art Reports™ 13,000 MAS 90® for WINDOWS® Shipments in First Nine Months of Availability"; PR Newswire; Apr. 28, 1997, 2 pages.

Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006, 2 pages.

Avery, S.; "Buyer's Guide to Software for Purchasing 2000.(Directory)"; Purchasing, vol. 129, No. 1; p. 179; Jul. 13, 2000.

Bastani et al.; "Complex Open System Design by Quasi Agents: Process Oriented Modeling in Agent Based Systems"; ACM SIGSOFT; vol. 34, No. 4; 2009; pp. 1-14.

Bastani et al.; "Process Oriented Abstraction of the Complex Evolvable Systems: Problem Model Construction"; ACM SIGSOFT; vol. 33, No. 3; 2008; pp. 1-13.

Duc et al.; "Uniform Object Modeling Methodology and Reuse of Real Time System Using UML"; EMSOFT '05; Sep. 19-22, 2005; pp. 44-47.

Gomaa et al.; "Model Based Software Design and Adaption"; International Workshop on Software Engineering for Adaptive and Self-Managing Systems (SEAMS '07); IEEE; 2007; 10 pages.

"Hudson's Bay Company Realizes Fast ROI with the Oracle E-Business Suite"; PR Newswire; New York; Jan. 15, 2002; p. 1.

Intuit Canada Ltd.; "Startup Guide—QuickBooks Basic for Windows, QuickBooks Pro for Windows, QuickBooks Premier for Windows"; 2002; 230 pages.

Lambert et al.; "Supply Chain Metrics"; International Journal of Logistics Management; vol. 12, No. 1; 2001; pp. 1-19.

mySAP™ ERP 2005; Downloaded Mar. 24, 2010 from http://web.archive.org/web/20061104021205/www.sap.com/lsolutions/business-suite/erp/pdf/BWP_mySAP_ERP_2005.pdf; 60 pages.

Ouyang et al.; "From Business Process Models to Process Oriented Software Systems"; ACM Transactions on Software Engineering and Methodology; vol. 19, No. 1, Article 2; Aug. 2009; pp. 1-37.

Rossi et al.; "Designing and Architecturing Process-aware Web Applications with EPML"; SAC '08; Mar. 16-20, 2008; pp. 2409-2414.

"SAP Delivers Next-generation ERP to Customers"; PR Newswire; New York; Mar. 10, 2005; 7 pages.

Schultz, G.J.; "Keeping SCOR on Your Supply Chain: Basic Operations Reference Model Updates with the Times"; Information Strategy: The Executive's Journal; Summer 2003; pp. 12-20.

"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.

Vogel et al.; "mySAP ERP for Dummies"; Published on Sep. 30, 2005; Downloaded on Mar. 23, 2001 from <http://proquest.safaribooksonline.com/9780764599958> 41 pages.

Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Office Action issued in U.S. Appl. No. 11/322,772; Dec. 9, 2009; 14 pages.
Office Action issued in U.S. Appl. No. 11/322,398 on Apr. 2, 2010; 39 pages.
Office Action issued in U.S. Appl. No. 11/322,383; Nov. 12, 2009; 23 pages.
Office Action issued in U.S. Appl. No. 11/322,382 on Mar. 29, 2010; 28 pages.
Office Action issued in U.S. Appl. No. 11/323,041 on Mar. 19, 2010; 26 pages.
Notice of Allowance issued in U.S. Appl. No. 11/396,259 on Mar. 29, 2010; 19 pages.
Office Action issued in U.S. Appl. No. 11/396,288; Aug. 19, 2009; 15 pages.
Office Action issued in U.S. Appl. No. 11/396,258; Nov. 25, 2009; 9 pages.
Notice of Allowance issued in U.S. Appl. No. 11/396,258 on Mar. 31, 2010; 9 pages.
Office Action issued in U.S. Appl. No. 11/396,236 on Mar. 31, 2010; 20 pages.
Office Action issued in U.S. Appl. No. 11/323,039; Sep. 4, 2009; 26 pages.
Office Action issued in U.S. Appl. No. 11/322,851; Sep. 2, 2009; 20 pages.
Office Action issued in U.S. Appl. No. 11/323,040; Jul. 24, 2009; 26 pages.
Office Action issued in U.S. Appl. No. 11/322,612; Apr. 1, 2010; 23 pages.
Office Action issued in U.S. Appl. No. 11/397,029; Jul. 21, 2009;18 pages.
Notice of Allowance issued in U.S. Appl. No. 11/397,026 on Mar. 29, 2010; 17 pages.
Notice of Allowance issued in U.S. Appl. No. 11/967,865 on Mar. 31, 2010; 16 pages.
Office Action issued in U.S. Appl. No. 11/323,590; Jul. 10, 2009; 25 pages.
Office Action issued in U.S. Appl. No. 11/323,590; Dec. 30, 2009; 24 pages.
Office Action issued in U.S. Appl. No. 11/323,634; Sep. 10, 2009; 9 pages.
Office Action issued in U.S. Appl. No. 11/323,634; Apr. 2, 2010; 9 pages.
Office Action issued in U.S. Appl. No. 11/322,816; Jul. 23, 2006; 35 pages.
Office Action issued in U.S. Appl. No. 11/396,327 on Apr. 1, 2010; 26 pages.
Office Action issued in U.S. Appl. No. 12/333,085; Jun. 25, 2009; 9 pages.
Office Action issued in U.S. Appl. No. 12/333,085; Mar. 23, 2010; 5 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Bin et al.; "Component Model Optimization for Distributed Real-Time Embedded Software"; IEEE International Conference on Systems, Man and Cybernetics; Oct. 13, 2004; 6 pages.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cox et al.; "A Formal Model for Component Based Software"; IEEE; Aug. 7, 2002; 8 pages.
Ferscha et al.; "A Light-Weight Component Model for Peer-to-Peer Applications"; IEEE; Mar. 23, 2004.
Finin et al.; "KQML as an Agent Communication Language"; retrieved on Jul. 26, 2011; pp. 456-463. <http://portal.acm.org/citation.cfm?id=191322>.
Flissi et al.; "A Component-based Software Infrastructure for Ubiquitous Computing"; IEEE; Jul. 4, 2005.
Gould; "Integrating the Manufacturing Enterprise"; Automative Design & Production; 119, 1; ABI/INFORM Global; Jan. 2007; 3 pages.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0-8306-7626-0.
Papazoglou et al; "Service-Oriented Computing Research Road Map"; http://infolab.uvt.nl/pub/papazogloump-2006-96.pdf; Mar. 1, 2006; 29 pages.
SAP AG; "SAP NetWeaver Visual Composer: User Guide (SAP NetWeaver Visual Composer release 6.0)"; Document version 1.1; 2004; pp. 1-208.
SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMWFAQ_50070686_en.pdf.
Strelich, Thomas P. et al.; "Simulation-Based Transformation with the Service Integration/Interoperation Infrastructure"; Technology Review Journal; Fall/Winter 2005; pp. 99-115.
Office Action issued in U.S. Appl. No. 11/396,236 on Oct. 28, 2010; 19 pages.
Notice of Allowance issued in U.S. Appl. No. 12/233,554 on Feb. 22, 2011; 7 pages.
Notice of Allowance issued in U.S. Appl. No. 12/233,554 on Jun. 27, 2011; 7 pages.
Office Action issued in U.S. Appl. No. 12/233,550 on Jan. 12, 2011; 29 pages.
Notice of Allowance issued in U.S. Appl. No. 12/233,550 on May 11, 2011; 20 pages.
Office Action issued in U.S. Appl. No. 12/333,146 on Sep. 6, 2011; 21 pages.
Office Action issued in U.S. Appl. No. 11/323,634 on Apr. 29, 2011; 8 pages.
Office Action issued in U.S. Appl. No. 11/322,973 on Dec. 7, 2010; 13 pages.
Office Action issued in U.S. Appl. No. 11/322,973 on May 27, 2011; 15 pages.
Notice of Allowance issued in U.S. Appl. No. 11/396,327 on Nov. 30, 2010; 28 pages.
Office Action issued in U.S. Appl. No. 11/404,147 on Nov. 24, 2010; 27 pages.
Office Action issued in U.S. Appl. No. 11/404,147 on Aug. 4, 2011; 26 pages.
Notice of Allowance issued in U.S. Appl. No. 12/233,462 on Feb. 2, 2011; 11 pages.
Notice of Allowance issued in U.S. Appl. No. 12/233,462 on May 18, 2011; 6 pages.
Notice of Allowance issued in U.S. Appl. No. 12/233,462 on Sep. 2, 2011; 7 pages.
Office Action issued in U.S. Appl. No. 12/233,457 on May 26, 2011; 19 pages.
Office Action issued in U.S. Appl. No. 11/967, 483 on Mar. 4, 2011; 6 pages.
Office Action issued in U.S. Appl. No. 12/327,232 on May 26, 2011; 20 pages.
Office Action issued in U.S. Appl. No. 12/327,590 on Jun. 23, 2011; 16 pages.
Office Action issued in U.S. Appl. No. 12/233,087 on Aug. 18, 2011; 42 pages.
Notice of Allowance issued in U.S. Appl. No. 12/233,534 on Oct. 20, 2010; 15 pages.

Notice of Allowance issued in U.S. Appl. No. 12/233,534 on Jan. 31, 2011; 15 pages.
Notice of Allowance issued in U.S. Appl. No. 12/233,534 on May 16, 2011; 12 pages.
Notice of Allowance issued in U.S. Appl. No. 11/322,382 on Jan. 6, 2011; 7 pages.
Notice of Allowance issued in U.S. Appl. No. 11/322,382 on Jul. 25, 2011; 5 pages.
Notice of Allowance issued in U.S. Appl. No. 11/322,610 on Dec. 22, 2010; 6 pages.
Notice of Allowance issued in U.S. Appl. No. 11/322,610 on Mar. 31, 2011; 6 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowanced issued in U.S. Appl. No. 11/322,398 on May 27, 2011; 21 pages.
Notice of Allowance issued in U.S. Appl. No. 11/396,259 on Oct. 15, 2010; 6 pages.
Notice of Allowance issued in U.S. Appl. No. 11/396,259 on Jan. 20, 2011; 6 pages.
Notice of Allowance issued in U.S. Appl. No. 11/396,259 on Aug. 5, 2011; 7 pages.
Notice of Allowance issued in U.S. Appl. No. 11/396,288; Dec. 28, 2010; 4 pages.
Office Action issued in U.S. Appl. No. 11/396,250 on Oct. 18, 2010; 15 pages.
Notice of Allowance issued in U.S. Appl. No. 11/396,250 on Mar. 2, 2011; 13 pages.
Notice of Allowance issued in U.S. Appl. No. 11/396,250 on Jun. 24, 2011; 5 pages.
Notice of Allowance issued in U.S. Appl. No. 11/396,258 on Nov. 16, 2010; 8 pages.
Notice of Allowance issued in U.S. Appl. No. 11/396,258 on Jun. 28, 2011; 9 pages.
Notice of Allowance issued in U.S. Appl. No. 11/322,851 on Sep. 2, 2011; 8 pages.
Notice of Allowance issued in U.S. Appl. No. 11/322,845; Dec. 27, 2010; 16 pages.
Notice of Allowance issued in U.S. Appl. No. 11/322,845; Apr. 8, 2011; 8 pages.
Office Action issued in U.S. Appl. No. 11/323,040 on Nov. 5, 2010; 33 pages.
Office Action issued in U.S. Appl. No. 11/323,040 on Jul. 26, 2011; 34 pages.
Notice of Allowance issued in U.S. Appl. No. 11/397,026 on Nov. 15, 2010; 7 pages.
Notice of Allowance issued in U.S. Appl. No. 11/397,026 on Mar. 3, 2011; 6 pages.
Notice of Allowance issued in U.S. Appl. No. 11/397,026 on Jul. 20, 2011; 8 pages.
Office Action issued in U.S. Appl. No. 12/233,417 on Apr. 7, 2011; 32 pages.
Notice of Allowance issued in U.S. Appl. No. 12/233,417 on Sep. 14, 2011; 11 pages.
Notice of Allowance issued in U.S. Appl. No. 11/968,054 on Aug. 2; 5 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,557 on Mar. 4, 2011; 19 pages.
Office Action issued in U.S. Appl. No. 12/233,489 on May 13, 2011; 15 pages.
Office Action issued in U.S. Appl. No. 11/967,393 o n Apr. 15, 2011; 12 pages.
Notice of Allowance issued in U.S. Appl. No. 12/327,354 on Oct. 18, 2010; 16 pages.
Notice of Allowance issued in U.S. Appl. No. 12/327,354 on Feb. 1, 2011; 16 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.
"American Software Announces ASP Pricing Model for It's a-Applications Expense Business Solution"; PR Newswire; Mar. 6, 2000; 2 pages.
Cascallar, Eduardo et al.; "Assessment in the Evaluation of Self-Regulation as a Process"; Educational Psychology Review; vol. 18, No. 3; Sep. 2006; pp. 297-306.
"Cendant Announces Comprehensive Online Travel Booking to Meet President Bush's eTravel Initiative"; PR Newswire; Jul. 9, 2002; 3 pages.
Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.
Cool, David W.; "Activity Fund Accounting"; School Business Affairs; vol. 49, No. 6; Jun. 1983; pp. 50-52.
Huang, S. et al.; "Computer-Assisted Supply Chain Configuration Based on Supply Chain Operations Reference (SCOR) Model"; Computers & Industrial Engineering 48; 2005; pp. 377-394.
Lockamy III, et al.; "Linking SCOR Planning Practices to Supply Chain Performance"; International Journal of Operationgs & Production Management; vol. 24, No. 12; pp. 1192-1218.
"Oracle Expands E-Commerce Offerings with the Acquisition of E-Travel, Inc."; PR Newswire; Mar. 9, 1999; 3 pages.
Stephens, S.; "Supply Chain Council & Supply Chain Operations Reference (SCOR) Model Overview"; <http://www.supply-chain.org>; Version 5.0a; Aug. 2001; 29 pages.
Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.
Office Action issued in U.S. Appl. No. 11/396,312 on Sep. 10, 2010; 23 pages.
Office Action issued in U.S. Appl. No. 11/322,611 on Sep. 16, 2010; 21 pages.
Notice of Allowance issued in U.S. Appl. No. 11/322,610 on Jun. 14, 2010; 6 pages.
Notice of Allowance issued in U.S. Appl. No. 11/322,610 on Sep. 23, 2010; 6 pages.
Office Action issued in U.S. Appl. No. 11/322,772; Jul. 12, 2010; 18 pages.
Notice of Allowance issued in U.S. Appl. No. 11/322,398 on Jul. 23, 2010; 38 pages.
Office Action issued in U.S. Appl. No. 11/322,383; May 12, 2010; 23 pages.
Notice of Allowance issued in U.S. Application No. 1/322,382 on Sep. 20, 2010; 6 pages.
Advisory Action issued in U.S. Appl. No. 11/323,041 on Jun. 7, 2010; 3 pages.
Notice of Allowance issued in U.S. Appl. No. 11/396,259 on Jul. 6, 2010; 6 pages.
Notice of Allowance issued in U.S. Appl. No. 11/396,288; Sep. 24, 2010; 4 pages.
Notice of Allowance issued in U.S. Appl. No. 11/396,288; May 20, 2010; 15 pages.
Supplemental Notice of Allowance issued in U.S. Appl. No. 11/396,258 on May 19, 2010; 8 pages.
Notice of Allowance issued in U.S. Appl. No. 11/396,258 on Jul. 28, 2010; 9 pages.
Office Action issued in U.S. Appl. No. 11/323,039; Apr. 14, 2010; 15 pages.
Office Action issued in U.S. Appl. No. 11/322,851; May 12, 2010; 15 pages.

Office Action issued in U.S. Appl. No. 11/322,845; Jul. 15, 2010; 16 pages.
Office Action issued in U.S. Appl. No. 11/323,040; Apr. 29, 2010; 17 pages.
Advisory Action issued in U.S. Appl. No. 11/322,612; Jun. 24, 2010; 3 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 12/233,554 on May 14, 2010; 11 pages.
Notice of Allowance issued in U.S. Appl. No. 12/233,554 on Sep. 17, 2010; 10 pages.
Notice of Allowance issued in U.S. Appl. No. 11/968,054 on Sep. 7, 2010; 11 pages.
Office Action issued in U.S. Appl. No. 12/233,557 on Sep. 16, 2010; 16 pages.
Notice of Allowance issued in U.S. Appl. No. 12/233,534 on Jun. 24, 2010; 15 pages.
Notice of Allowance issued in U.S. Appl. No. 12/327,354 on Jun. 25, 2010; 16 pages.
Notice of Allowance issued in U.S. Appl. No. 11/967,865 on Oct. 6, 2010; 6 pages.
Office Action issued in U.S. Appl. No. 11/323,590; Jun. 21, 2010; 25 pages.
Office Action issued in U.S. Appl. No. 11/322,816; Apr. 15, 2010; 27 pages.
Office Action issued in U.S. Appl. No. 11/967,483; Aug. 20, 2010; 10 pages.
Notice of Allowance issued in U.S. Appl. No. 12/333,085; Sep. 13, 2010; 8 pages.
Anonymous; "Mastering Management"; Motor Age, vol. 25, No. 10; Oct. 2006; pp. 1-3.
Business Editors/Technology Writers; "CrossWorlds Software Announces J2EE Interoperability with Open Standards Interface"; Business Wire, 1; Nov. 20; Retrieved on Jun. 12, 2012.
"Extensity and Visa International Partner to Streamline Corporate Purchasing Practices"; PR Newswire; Feb. 14, 2000; Business Dateline, ProQuest, Web; Aug. 7, 2012.
Gerin et al.; "Flexible and Executable Hardware/Software Interface Modeling for Multiprocessor SOC Design Using SystemC"; IEEE; 2007; pp. 390-395.
Hahn; "A Domain Specific Modeling Language for Multi-Agent Systems"; ACM AAMAS; 2008; pp. 233-240.
Hu et al.; "A Building an e-Agriculture Business Intergration Platform with Web Services Composition"; IEEE; 2008; pp. 340-344.
Hu; "A Co-Design Modeling Approach for Computer Network Systems"; IEEE; 2007; pp. 685-693.
"IDe Partners with Journyx to Offer Customers Best-in-Class Time Management Solution"; PR Newswire; Mar. 8, 2005; Business Dateline.
Kagermann, Prof. Dr. Henning & Dr. Peter Zencke; "Plug-and-Play Vision Nears Reality with BPM"; Business Times; Sep. 8, 2005; p. 9.
Kloppmann et al.; "Business Process Choreography in WebSphere: Combining the Power of BPEL and J2EE"; IBM Systems Journal; 2004.
Kremic, Tibor; "Outsourcing Decision Support: A Survey of Benefits, Risks, and Decision Factor"; Supply Chain Management; V. 11; 2006; pp. 467-482.
Mani et al.; "Towards Information Networks to Support Composable Manufacturing"; PerMIS 2008.
Meseroll, Robert; "Data Mining Navy Flight"; IEEE Autotestcom 2007; Sep. 2007; pp. 476-481.
Molina et al.; "Resuable Knowledge Based Components for Building Software Applications: A Knowledged Modeling Approach; International Journal of Software Engineering and Knowledge Engineering"; vol. 9, No. 3; 1999; pp. 297-317.
Sarjoughian et al.; "CoSMOs: A Visual Environment for Component Based Modeling, Experimental Design and Simulation"; ACM; 2009; pp. 1-9.

"SAP NetWeaver Empowers IT to Drive Innovation into Business Processes across the Enterprise"; Canada NewsWire, 1; May 13; Retrieved on Jun. 12, 2012.
Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.
"Trakware Systems Inc. Expands Management Team: Leading To-Order Software Provider Adds Experienced Global VP Sales and Marketing to its World-Class Team"; Canada NewsWire; Apr. 9, 2008.
Trappey, Amy; "Design and Analysis of a Rule Based Knowledge"; International Journal of Manufacturing Tech; Dec. 2007; 35,3-4:385-93.
Vescovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.
Zeng et al.; "Model Analysis for Business Event Processing"; IBM Systems Journal 2007.
Zimmermann et al.; "Service-Oriented Architecture and Business Process Choreography in an Order Management Scenario: Rationale, Concepts, Lessons Learned"; OOPLA 2005.
Examiner's Answer to Appeal Brief issued in U.S. Appl. No. 11/396,236 on Nov. 10, 2011; 19 pages.
Notice of Allowance in U.S. Appl. No. 12/233,462 on Apr. 5, 2012; 7 pages.
Notice of Allowance in U.S. Appl. No. 12/233,462 on Dec. 12, 2011; 6 pages.
Notice of Allowance issued in U.S. Appl. No. 11/322,382 on May 21, 2012; 5 pages.
Notice of Allowance issued in U.S. Appl. No. 11/322,816 on Aug. 29, 2012; 18 pages.
Notice of Allowance issued in U.S. Appl. No. 11/322,845; Nov. 3, 2011; 9 pages.
Notice of Allowance issued in U.S. Appl. No. 11/322,845; Aug. 10, 2012; 8 pages.
Notice of Allowance issued in U.S. Appl. No. 11/322,851 on Sep. 27, 2012; 9 pages.
Notice of Allowance issued in U.S. Appl. No. 11/322,851 on Mar. 1, 2012; 9 pages.
Notice of Allowance issued in U.S. Appl. No. 11/323,040 on Jun. 8, 2012; 9 pages.
Notice of Allowance issued in U.S. Appl. No. 11/323,634 on Jan. 25, 2012; 5 pages.
Notice of Allowance issued in U.S. Appl. No. 11/323,634 on Aug. 9, 2012; 20 pages.
Notice of Allowance issued in U.S. Appl. No. 11/396,250 on Dec. 7, 2011; 6 pages.
Notice of Allowance issued in U.S. Appl. No. 11/396,250 on Jul. 10, 2012; 6 pages.
Notice of Allowance issued in U.S. Appl. No. 11/396,258 on Aug. 21, 2012; 11 pages.
Notice of Allowance issued in U.S. Appl. No. 11/396,258 on Feb. 3, 2012; 12 pages.
Notice of Allowance issued in U.S. Appl. No. 11/396,259 on Oct. 2, 2012; 7 pages.
Notice of Allowance issued in U.S. Appl. No. 11/396,259 on Mar. 15, 2012; 7 pages.
Notice of Allowance issued in U.S. Appl. No. 11/396,288; Apr. 27, 2012; 15 pages.
Notice of Allowance issued in U.S. Appl. No. 11/396,327 on Jun. 20, 2012; 29 pages.
Notice of Allowance issued in U.S. Appl. No. 11/396,327 on Sep. 28, 2011; 31 pages.
Notice of Allowance issued in U.S. Appl. No. 11/397,026 on Feb. 23, 2012; 8 pages.
Notice of Allowance issued in U.S. Appl. No. 11/397,026 on Nov. 4, 2011; 8 pages.
Notice of Allowance issued in U.S. Appl. No. 11/404,147 on Jul. 5, 2012; 5 pages.

Notice of Allowance issued in U.S. Appl. No. 11/967,393 on Nov. 9, 2011; 9 pages.
Notice of Allowance issued in U.S. Appl. No. 11/967,405 on Aug. 17, 2012; 15 pages.
Notice of Allowance issued in U.S. Appl. No. 12/233,075 on Mar. 22, 2012; 25 pages.
Notice of Allowance issued in U.S. Appl. No. 12/233,087 on Mar. 30, 2012; 30 pages.
Notice of Allowance issued in U.S. Appl. No. 12/233,289 on Feb. 15, 2012; 11 pages.
Notice of Allowance issued in U.S. Appl. No. 12/233,417 on Jul. 27, 2012; 10 pages.
Notice of Allowance issued in U.S. Appl. No. 12/233,457 on May 16, 2012; 7 pages.
Notice of Allowance issued in U.S. Appl. No. 12/233,457 on Nov. 3, 2011; 12 pages.
Notice of Allowance issued in U.S. Appl. No. 12/233,458 on May 1, 2012; 17 pages.
Notice of Allowance issued in U.S. Appl. No. 12/233,520 on Nov. 10, 2011; 22 pages.
Notice of Allowance issued in U.S. Appl. No. 12/233,534 won Dec. 28, 2011; 7 pages.
Notice of Allowance issued in U.S. Appl. No. 12/233,534 won Jul. 18, 2012; 16 pages.
Notice of Allowance issued in U.S. Appl. No. 12/233,550 on Jan. 9, 2012; 11 pages.
Notice of Allowance issued in U.S. Appl. No. 12/233,554 on Aug. 3, 2012; 8 pages.
Notice of Allowance issued in U.S. Appl. No. 12/327,232 on Jun. 6, 2012; 7 pages.
Notice of Allowance issued in U.S. Appl. No. 12/327,232 on Nov. 2, 2011; 16 pages.
Notice of Allowance issued in U.S. Appl. No. 12/327,354 on Jul. 25, 2012; 17 pages.
Notice of Allowance issued in U.S. Appl. No. 12/327,590 on Dec. 28, 2011; 10 pages.
Notice of Allowance issued in U.S. Appl. No. 12/327,590 on Jul. 19, 2012; 11 pages.
Notice of Allowance issued in U.S. Appl. No. 12/327,701 on Apr. 6, 2012; 9 pages.
Notice of Allowance issued in U.S. Appl. No. 12/327,737 on Jul. 10, 2012; 7 pages.
Notice of Allowance issued in U.S. Appl. No. 12/332,965 on Jun. 11, 2012; 21 pages.
Notice of Allowance isued in U.S. Appl. No. 11/323,039 on Jun. 7, 2012; 9 pages.
Notice of Allowanced issued in U.S. Appl. No. 11/322,398 on May 3, 2012; 7 pages.
Notice of Allowanced issued in U.S. Appl. No. 11/322,398 on Oct. 18, 2011; 7 pages.
Notice of Allowance issued in U.S. Appl. No. 11/322,383 on May 21, 2012; 14 pages.
Supplemental Notice of Allowance issued in U.S. Appl. No. 12/333,085; Jun. 13, 2012; 5 pages.
Office Action issued in U.S. Appl. No. 11/322,482; Aug. 21, 2012; 27 pages.
Office Action issued in U.S. Appl. No. 11/322,612 on Jun. 26, 2012; 11 pages.
Office Action issued in U.S. Appl. No. 11/322,816 on Jun. 7, 2012; 12 pages.
Office Action issued in U.S. Appl. No. 11/323,041 on Jun. 7, 2012; 12 pages.
Office Action issued in U.S. Appl. No. 11/396,252 on Nov. 10, 2011; 18 pages.
Office Action issued in U.S. Appl. No. 11/396,288 on Oct. 17, 2011; 38 pages.
Office Action issued in U.S. Appl. No. 11/967,387 on Apr. 12, 2012; 13 pages.
Office Action issued in U.S. Appl. No. 11/967,489 on Feb. 6, 2012; 9 pages.
Office Action issued in U.S. Appl. No. 11/967,489 on Sep. 28, 2011; 7 pages.
Office Action issued in U.S. Appl. No. 12/233,289 on Oct. 27, 2011; 15 pages.
Office Action issued in U.S. Appl. No. 12/233,458 on Oct. 12, 2011; 19 pages.
Office Action issued in U.S. Appl. No. 12/233,479 on May 7, 2012; 26 pages.
Office Action issued in U.S. Appl. No. 12/233,479 on Oct. 27, 2011; 24 pages.
Office Action issued in U.S. Appl. No. 12/233,489 on Jun. 6, 2012; 87 pages.
Office Action issued in U.S. Appl. No. 12/327,701 on Nov. 8, 2011; 20 pages.
Office Action issued in U.S. Appl. No. 12/327,737 on Mar. 26, 2012; 14 pages.
Office Action issued in U.S. Appl. No. 12/332,965 on Oct. 11, 2011; 6 pages.
Office Action issued in U.S. Appl. No. 12/333,146 on Feb. 2, 2012; 21 pages.
Office Action issued in U.S. Appl. No. 13/413,069 on Aug. 1, 2012; 18 pages.

* cited by examiner

ARCHITECTURAL DESIGN FOR MAKE TO STOCK APPLICATION SOFTWARE

BACKGROUND

The subject matter of this patent application relates to computer software architecture, and more particularly to the architecture of application software for make to stock.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for a software application.

The invention can be implemented as methods, systems, and apparatus, including computer program products, for implementing a software architecture design for a software application implementing a make to stock process. The application is structured as multiple process components interacting with each other through service interfaces, and multiple service interface operations, each being implemented for a respective process component. The process components include an Accounting process component; a Production process component; a Site Logistics process component; a Confirmation and Inventory process component; a Customer Requirement Processing process component; a Demand Forecast Processing process component; a Supply and Demand Matching process component; a Production Trigger and Response process component; an In-house Requirement Processing process component; a Sales Scheduling Agreement Processing process component; and a Demand Planning process component.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
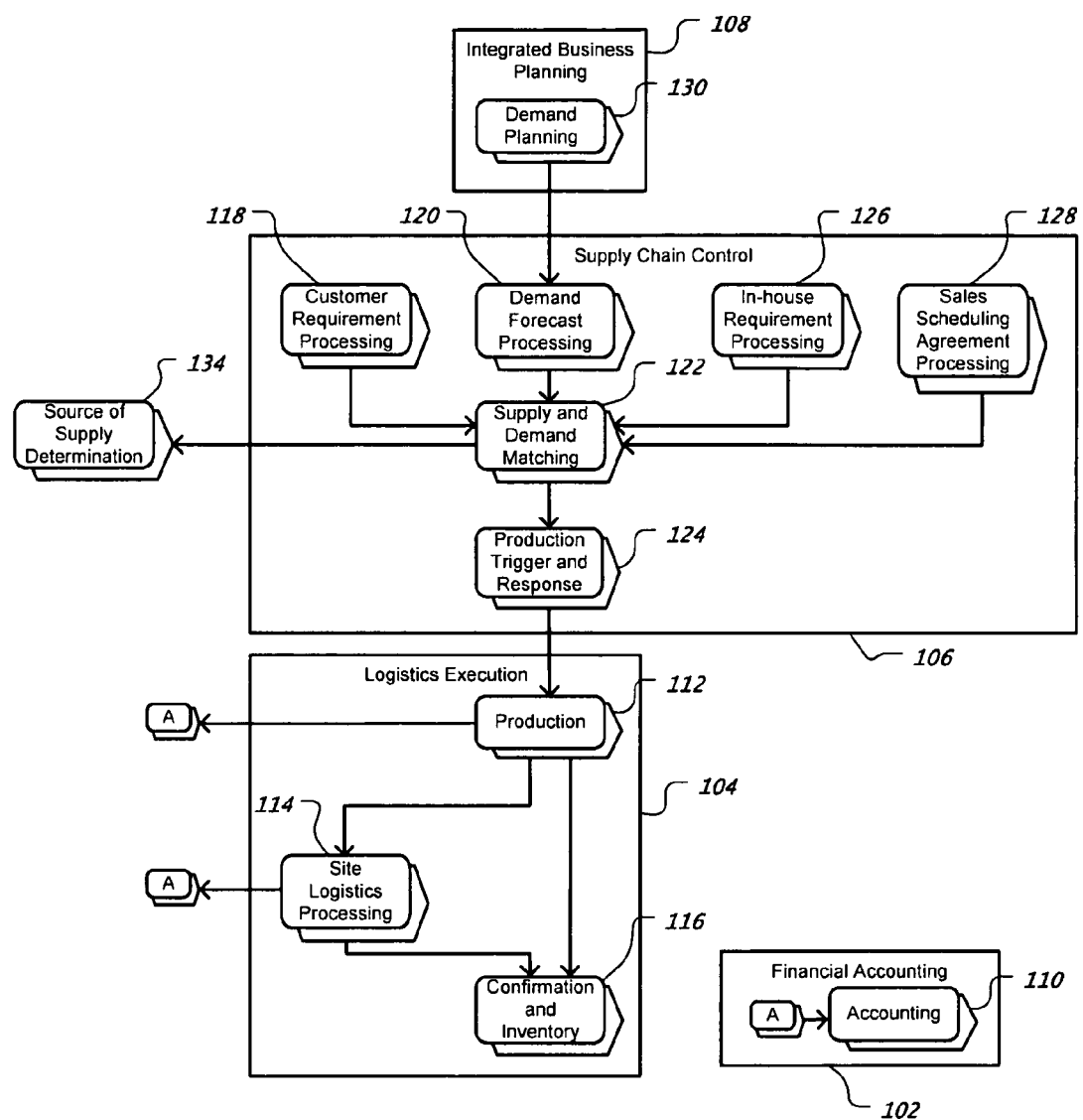
FIG. 1 is a block diagram of a software architectural design for a make to stock software application.

FIG. 1 shows the software architectural design for a make to stock software application. The make to stock application is software that implements an end-to-end process used to produce goods to replenish stock.

As shown in FIG. 1, the make to stock design includes four deployment units: a Financial Accounting unit 102, a Logistics Execution unit 104, a Supply Chain Control unit 106, and an Integrated Business Planning unit 108.

The Financial Accounting deployment unit 102 contains an Accounting process component 110 that records all relevant business transactions.

The Logistics Execution deployment unit 104 includes three process components: a Production process component 112, a Site Logistics process component 114 and a Confirmation and Inventory process component 116. The Production process component 112 combines all the activities required to manage the production execution process on the manufacturing shop floor. Production requests are received from planning and are converted into production orders, production lots, and production tasks during the production preparation phase. The production order describes the production process. The production lot collects all actual data for the production process. The production tasks are used to dispatch self-contained work items to the operators on the shop floor. During the production execution and finalization phases, production confirmations are created which update inventory, finance, and planning.

The Site Logistics process component 114 supports all preparing and execution tasks concerning internal inventory movements. The Site Logistics process component 114 may also provide stock information and may enable decision making through exception and alert information. The Confirmation and Inventory process component 116 combines all the tasks required to confirm inventory changes and provided activities.

The Supply Chain Control deployment unit 106 includes six process components: a Customer Requirement Processing process component 118, a Demand Forecast Processing process component 120, a Supply and Demand Matching process component 122, a Production Trigger and Response process component 124, an In-house Requirement Processing process component 126 and a Sales Scheduling Agreement process component 128.

The Customer Requirement Processing process component 118 combines the tasks required for processing customer requirements and provides an interface to presales, sales and services. The Customer Requirement Processing process component 118 also receives the customer requirements, prepares them and passes them on to Supply and Demand Matching as supply planning requirements The Demand Forecast Processing process component 120 collects all demand forecasts for further processing. For example, a validation may be carried out, or the requirements may be split over time. According to the results created by the demand forecast component, the requirements are passed on to the supply and demand matching component as planned independent requirements.

The Supply and Demand Matching process component 122 combines all the tasks necessary to ensure that sufficient material receipt elements exist to cover material demand while taking available capacity into account. The Supply and Demand Matching process component 122 also collects all the various material demands from customer requirement processing, in-house requirement processing, demand forecast processing, and sales scheduling agreement processing.

The Production Trigger and Response process component 124 provides an interface to production from a supply planning perspective. It contains all the tasks necessary for creating and changing production requisitions. Furthermore, the Production Trigger and Response process component 124 receives information about the production progress from production and updates the production requisitions and stock data according to this information The In-house Requirement Processing process component 126 combines the tasks required for processing in-house requirements and provides an interface to a Supplier Relationship Management solution from a Supply Chain Control view. The In-house Requirement Processing process component 126 collects all the in-house (planned independent) requirements for which it triggers sourcing and substitution. According to the results of these tasks, the requirements are passed on to Supply and Demand Matching process component as supply planning requirements.

The Sales Scheduling Agreement Processing process component 128 combines all tasks required for the inbound processing of delivery schedules and the outbound processing of delivery schedule confirmations.

The Integrated Business Planning deployment unit 108 includes a Demand Planning process component 130. The Demand Planning process component 130 combines all the tasks required to anticipate future demand. This information may then be used for supply and capacity planning.

The foundation layer, described below, includes a Source of Supply Determination process component 134.

The Source of Supply Determination process component 134 uses two business objects to determine a source of supply: a supply quota arrangement business object, and a source of supply business object.

Figure 2:
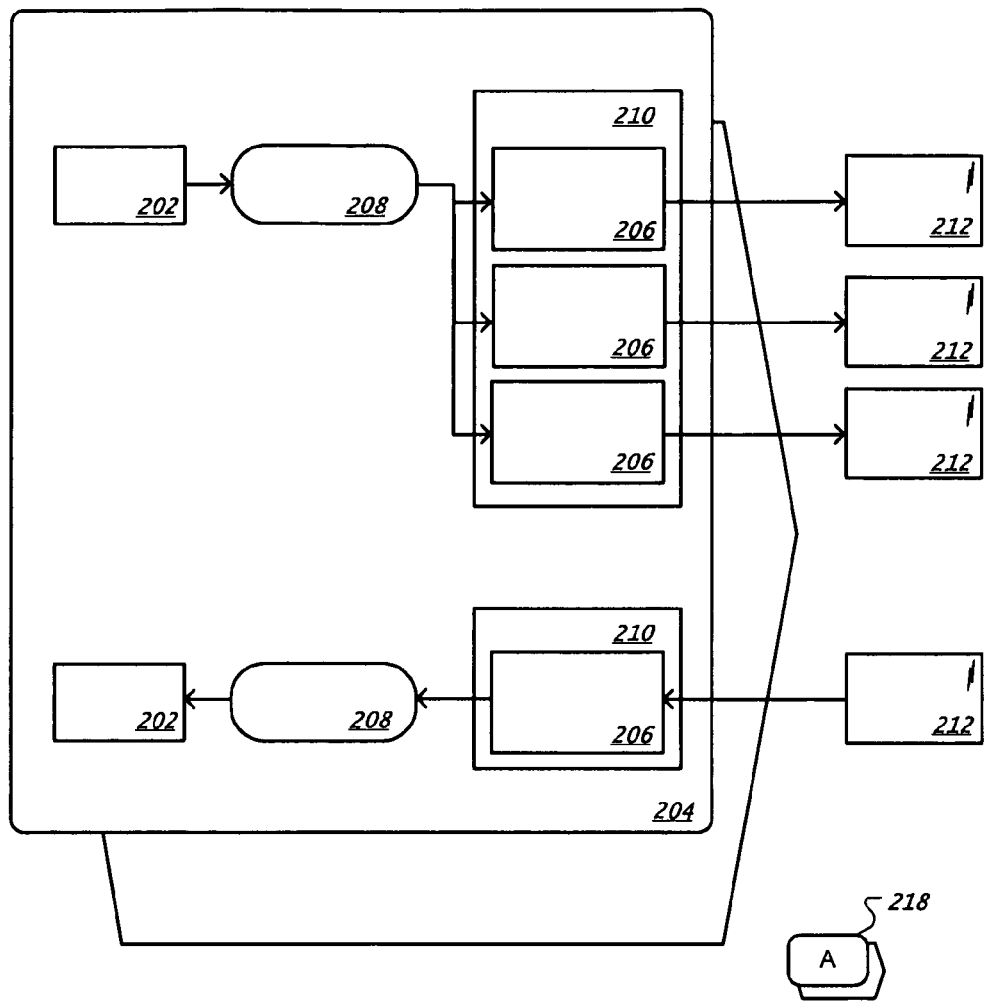
FIG. 2 illustrates the elements of the architecture as they are drawn in the figures of this patent application.
Figure 2:
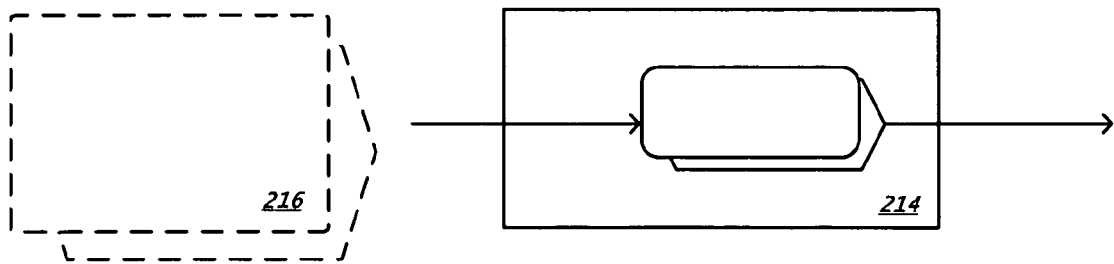

FIG. 2 illustrates the elements of the architecture as they are drawn in the figures of this patent application. The elements of the architecture include the business object (drawn as icon 202), the process component (drawn as icon 204), the operation (drawn as icon 206), the process agent (drawn as icon 208), the service interface or interface (drawn as icon 210), the message (drawn as icon 212), and the deployment unit (drawn as icon 214).

Not explicitly represented in the figures is a foundation layer that contains all fundamental entities that are used in multiple deployment units. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer will generally be master data objects. In addition, the foundation layer will include some business process objects that are used by multiple deployment units. Master data objects and business process objects that should be specific to a deployment unit are assigned to their respective deployment unit.

A process component of an external system is drawn as a dashed-line process component (drawn as icon 216). Such a process component is used to represent the external system in describing interactions with the external system; however, this should be understood to require no more of the external system that it be able to produce and receive messages as required by the process component that interacts with the external system.

The connector icon 218 is used to simplify the drawing of interactions between process components.

Interactions between process component pairs involving their respective business objects, process agents, operations, interfaces, and messages are described as process component interactions, which determine the interactions of a pair of process components across a deployment unit boundary, i.e., from one deployment unit to another deployment unit. Interactions between process components are indicated in FIG. 1 by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components, but interfaces, process agents, and business objects that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

The architectural elements include the business object. A business object is a representation of a type of a uniquely identifiable business entity (an object instance) described by a structural model. Processes operate on business objects.

A business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. A process component is a software package that realizes a business process and generally exposes its functionality as services. The functionality contains business transactions. A process component contains one or more semantically related business objects. Any business object belongs to no more than one process component.

Process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters serving as a signature.

The architectural elements also include the service interface, referred to simply as the interface. An interface is a named group of operations. Each operation belongs to exactly one interface. An interface belongs to exactly one process component. A process component might contain multiple interfaces. In one implementation, an interface contains only inbound or outbound operations, but not a mixture of both. One interface can contain both synchronous and asynchronous operations. All operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous.

Asynchronous outbound process agents are called after a business object changes, e.g., after a create, update, or delete of a business object instance.

Synchronous outbound process agents are generally triggered directly by a business object.

An output process agent will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

Operations and process components are described in this specification in terms of process agents. However, in alternative implementations, process components and operations can be implemented without use of agents using other conventional techniques to perform the functions described in this specification.

The architectural elements also include the deployment unit. A deployment unit includes one or more process components that are deployed together on a single computer system platform. Conversely, separate deployment units can be deployed on separate physical computing systems. For this reason, a deployment unit boundary defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement supports the operations of the original.

Interactions between Process Components "Production" and "Accounting"

Figure 3:
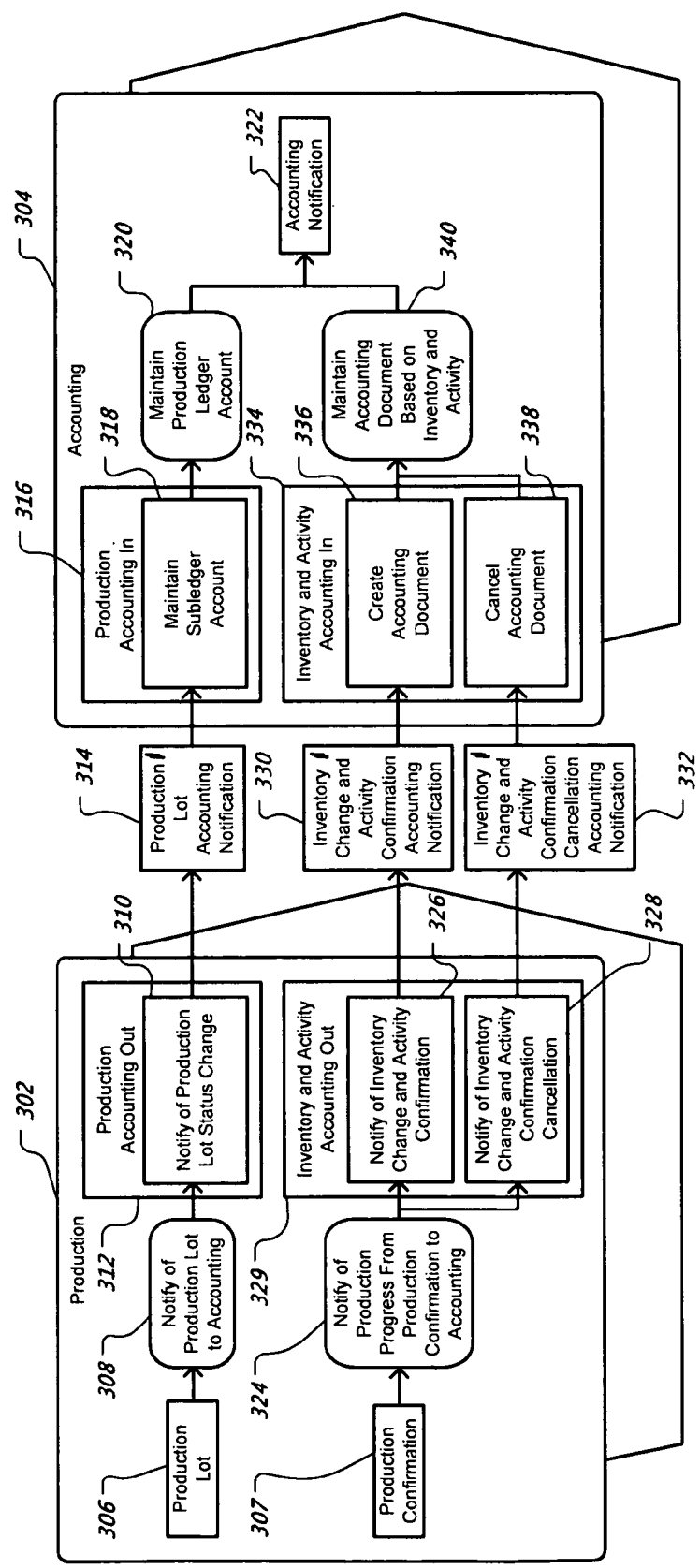
FIG. 3 is a block diagram showing interactions between a Production process component and an Accounting process component.

FIG. 3 is a block diagram showing interactions between a Production process component 302 and an Accounting process component 304 in the architectural design of FIG. 1. The Production process component 302 includes a Production Lot business object 306 and a Production Confirmation business object 307.

The Production Lot business object 306 is used to execute production. It collects all actual data for a homogeneous production process and documents its progress. By using a production lot, actual quantities are aggregated, confirmation documents are created and plan reductions are calculated. The Production Lot business object 306 forms the basis for integration with a Financials solution and for a process-oriented genealogy.

A Notify of Production Lot to Accounting outbound process agent 308 invokes a Notify of Production Lot Status Change operation 310 to inform Accounting Document Processing about a status change of a production lot. The Notify of Production Lot Status Change operation 310 is used in a Production Accounting Out Interface 312 and may transmit a Production Lot Accounting Notification message 314 to the Accounting process component 304. The message 314 is received in a Production Accounting In interface 316 by a Maintain Subledger Account operation 318. The Maintain Subledger Account operation 318 is a notification to inform Accounting Processing about creation, change or deletion of production orders. Upon receiving a notification message, a Maintain Production Ledger Account inbound process agent 320 may update the Accounting Notification business object 322. The Accounting Notification business object 322 is a common input channel for all kinds of operational business transactions into Financial Accounting that is called by operational components in order to record the business transactions in Financial Accounting.

The Production Confirmation business object 307 represents a document that collects actual data that was posted with reference to a production order. The Production Confirmation business object 307 updates inventory, finance and planning. A Notify of Production Progress from Production Confirmation to Accounting outbound process agent 324 may invoke a Notify of Inventory Change and Activity Confirmation operation 326 or a Request Inventory Change and Activity Confirmation Cancellation operation 328. Both operations are part of an Inventory And Activity Accounting Out interface 329 If the confirmation operation is invoked, then an Inventory Change and Activity confirmation Accounting Notification message 330 is sent to the Accounting process component 304. If the cancellation operation is invoked, then an Inventory Change and Activity Confirmation Accounting Cancellation Request message 332 is sent to the Accounting process component 304.

The messages 330 and 332 are received by an Inventory and Activity Accounting In interface 334 where operations may be performed. If a notification message is received, then a Create Accounting Document operation 336 is performed to Receive Inventory Change Accounting Notifications from the Production process component 302. If a cancellation message is received, then a Cancel Accounting Document operation 338 is performed to cancel requests received from the Production process components. Cancellations and updates may be sent by a Maintain Accounting Document based on Inventory and Activity inbound process agent 340 to the Accounting Notification business object 322.

Interactions between Process Components "Production Trigger and Response" and "Production"

Figure 4:
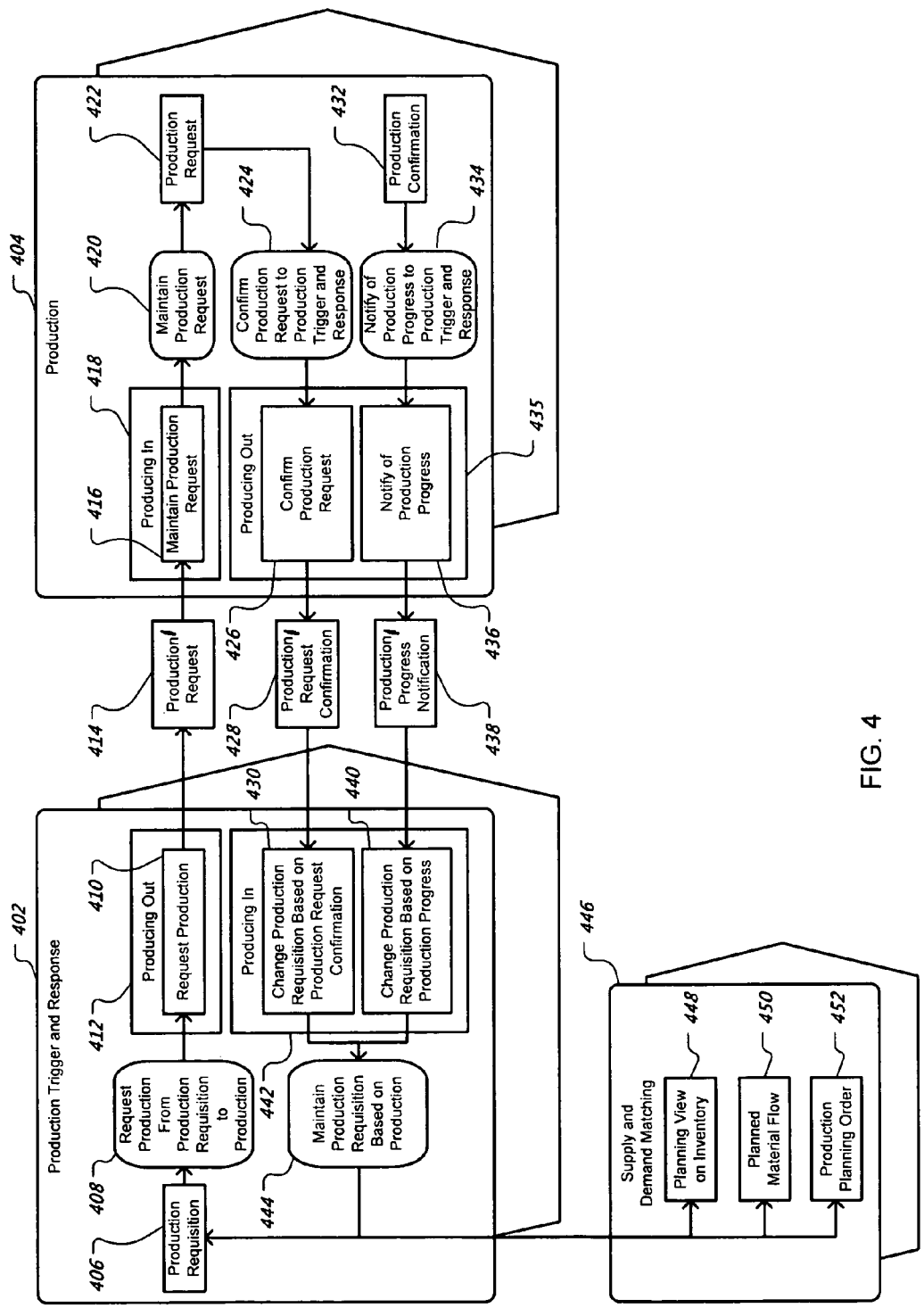
FIG. 4 is a block diagram showing interactions between a Production Trigger and Response process component and a Production process component.

FIG. 4 is a block diagram showing interactions between a Production Trigger and Response process component 402 and a Production process component 404 in the architectural design of FIG. 1. The Production Trigger and Response process component 402 includes a Production Requisition business object 406. The Production Requisition business object 406 represents a request for the production of a certain quantity of a finished product to be completed by the requested due date. The Production Requisition business object also contains information on: intermediate products required for the production of the requested quantity, accepted quantities and dates as confirmed by production, production progress and component consumption (e.g., product, quantity, time).

A Request Production from Production Requisition to Production outbound process agent 408 may invoke a Request Production operation 410 that sends a request to Production to produce a certain quantity of a specific material by a requested due date. The Request Production operation 410 is part of a Producing Out interface 412. Upon completion of the operation, a Production Request message 414 is sent to the Production process component 404. The message 414 is received in a Maintain Production Request operation 416 where production services are requested. The Maintain Production Request operation 416 is part of a Producing In interface 418. A Maintain Production Request inbound process agent 420 may then send an update to a Production Request business object 422. The Production Request business object 422 is a request from planning to manufacturing to produce a certain quantity of a certain product at a certain time.

The Production Request business object 422 may use a Confirm production Request to Production Trigger and Response outbound process agent 424 to invoke a Confirm Production Request operation 426. The operation 426 may generate and transmit a Production Request Confirmation message 428 to the Production Trigger and Response process component 402. The message 428 is received in a Change Production Requisition based on Production Request Confirmation operation 430.

A Production Confirmation business object 432 may use a Notify of Production Progress to Production Trigger and Response outbound process agent 434 to invoke a Notify of Production Progress operation 436. The operation 436 is part of a Production Out interface 435. The operation 436 may transmit a Production Progress Notification message 438 to the Production Trigger and Response process component 402. The message 438 is received in a Change Production Requisition based on Production Progress operation 440, which is part of a Producing In interface 442. A Maintain Production Requisition based on Production inbound process agent 444 may then update the Production Request business object 406.

Changes in production requisitions may be sent from the Production process component 404 to a Supply and Demand Matching process component 446, which may then update a Planning View on Inventory business object 448, a Planned Material Flow business object 450, and a Production planning Order business object 452.

Interactions Between Process Components "Site Logistics Processing" and "Accounting"

Figure 5:
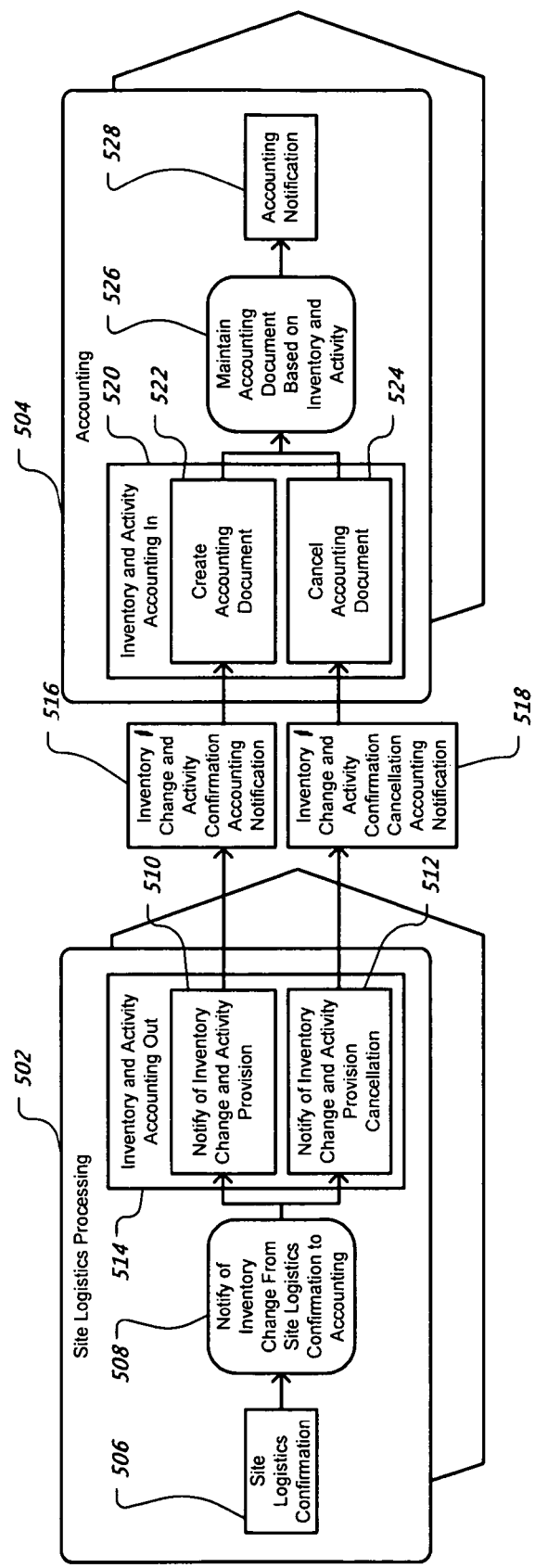
FIG. 5 is a block diagram showing interactions between a Site Logistics Processing process component and an Accounting process component.

FIG. 5 is a block diagram showing interactions between a Site Logistics Processing process component 502 and an Accounting process component 504 in the architectural design of FIG. 1. The Site Logistics Processing process component 502 includes a Site Logistics Confirmation business object 506, which is a document that collects actual data posted with reference to a site logistics order or site logistics request. The site logistics confirmation updates inventory, finance and planning.

A Notify of Inventory Change From Site Logistics Confirmation to Accounting outbound process agent 508 invokes a Notify of Inventory Change and Activity Provision operation 510 to send an Inventory Change Accounting Notification to Accounting. Alternatively, a Request Inventory Change and Activity Provision Cancellation operation 512 may be invoked to request inventory change and activity provision cancellation. Both operations may be used in an Inventory and Activity Accounting Out interface 514. If the Notify of Inventory Change and Activity Provision operation 510 is invoked, then an Inventory Change and Activity Confirmation Accounting Notification message 516 is sent to the Accounting process component 504. If the Request Inventory Change and Activity Provision Cancellation operation 512 is invoked, the Inventory Change and Activity Confirmation Accounting Cancellation Request message 518 is sent to the Accounting process component 504.

The messages 516 and 518 are received by an Inventory and activity Accounting In interface 520 where operations may be performed. If a notification message is received, then a Create Accounting Document operation 522 is performed to Receive Inventory Change Accounting Notification from Confirmation and Inventory or Site Logistics Processing or Production. If a cancellation message is received, then a Cancel Accounting Document operation 524 is performed to cancel requests received from Confirmation and Inventory or Site Logistics Processing or Production process components. Cancellations and updates may be sent by a Maintain Accounting Document based on Inventory and Activity inbound process agent 526 to the Accounting Notification business object 528.

Interactions Between Process Components "Demand Planning" and "Demand Forecast Processing"

Figure 6:
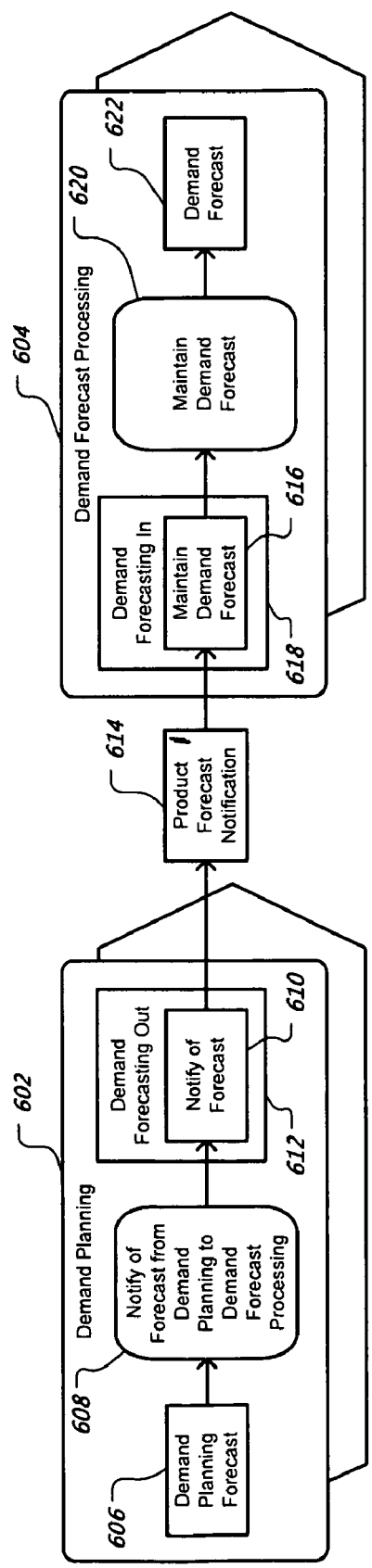
FIG. 6 is a block diagram showing interactions between a Demand Planning process component and a Demand Forecast Processing process component.

FIG. 6 is a block diagram showing interactions between a Demand Planning process component 602 and a Demand Forecast Processing process component 604 in the architectural design of FIG. 1. The Demand Planning process component 502 includes a Demand Planning Forecast business object 606 that contains the forecast for a variable grouping of business items which is released for subsequent processes.

The demand planning business object 606 may use a Notify of Forecast from Demand Planning to Demand Forecast Processing outbound process agent 608 to invoke a Notify of Forecast operation 610 that sends the current and deleted forecasts to the Demand Forecast Processing process component 604. The Notify of Forecast operation 610 is part of a Demand Forecasting Out interface 612. A Product Forecast Notification message 614 is then sent to a maintain Demand Forecast operation 616 that creates, updates or deletes the demand forecast object with the given forecast data. The Maintain Demand Forecast operation 616 is part of a Demand Forecasting In interface 618. A Maintain Demand Forecast inbound processing agent 620 may then update a Demand Forecast business object 622.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer program product comprising instructions encoded on a non-transitory tangible machine-readable medium, the instructions operable when executed by one or more processors to:
   define a plurality of process components, each of the process components comprising a modular and application-independent package of reusable, granular software implementing a respective and distinct business process, the business process comprising functionality exposed by the process component via a corresponding service interface, the plurality of process components including:
      an Accounting process component for recording relevant business transactions;
      a Production process component for combining the activities required to manage the production execution process on the manufacturing shop floor;
      a Site Logistics process component for supporting preparing and execution tasks concerning internal inventory movements;
      a Confirmation and Inventory process component for combining tasks required to confirm inventory changes and provided activities;
      a Customer Requirement Processing process component for combining tasks required for processing customer requirements and provides an interface to pre-sales, sales and services;
      a Demand Forecast Processing process component for collecting demand forecasts for further processing;
      a Supply and Demand Matching process component for combining tasks necessary to ensure that sufficient material receipt elements exist to cover material demand while taking available capacity into account;
      a Production Trigger and Response process component for providing an interface to production from a supply planning perspective;
      an In-house Requirement Processing process component for combining tasks required for processing in-house requirements;
      a Sales Scheduling Agreement Processing process component for combining tasks required for the inbound processing of delivery schedules and the outbound processing of delivery schedule confirmations; and
      a Demand Planning process component for combining all the tasks required to anticipate future demand; and
   define a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, interactions between the process components including interactions between:
      the Production process component and the Accounting process component, where the interaction between the Production process component and the Accounting process component includes the transmission of:
         a production lot accounting notification message from the Production process component to the Accounting process component, the production lot accounting notification message causing the Accounting process component to inform accounting processing of a creation, change, or deletion to production orders;
         an inventory change and activity confirmation accounting notification message from the Production process component to the Accounting process component, the inventory change and activity confirmation accounting notification message causing the Accounting process component to create an accounting document associated with the inventory change and activity; and
         an inventory change and activity confirmation cancellation accounting notification message from the Production process component to the Accounting process component, the inventory change and activity confirmation cancellation accounting notification message causing the Accounting process component to cancel a created accounting document associated with the inventory change and activity;
      the Production Trigger and Response process component and the Production process component, where the interaction between the Production Trigger and Response process component and the Production process component includes the transmission of:
         a production request message from the Production Trigger and Response process component to the Production process component, the production request message causing the Production process component to send an update request from planning to manufacturing to produce a certain quantity of a certain product at a certain time;
         a production request confirmation message from the Production process component to the Production Trigger and Response process component, the production request confirmation message providing a confirmation of the production request to the Production Trigger and Response process component; and
         a production progress notification message from the Production process component to the Production Trigger and Response process component, the production progress notification message providing updates on a production request to the Production Trigger and Response process component;
      the Site Logistics Processing process component and the Accounting process component, where the interaction between the Site Logistics Processing process component and the Accounting process component includes the transmission of:
  an inventory change and activity confirmation accounting notification message from the Site Logistics Processing process component to the Accounting process component, the inventory change and activity confirmation accounting notification message requests the generation of an accounting document associated with an inventory change accounting notification; and
  an inventory change and activity confirmation cancellation accounting notification message from the Site Logistics Processing process component to the Accounting process component, the inventory change and activity confirmation cancellation accounting notification message cancelling requests for the generation of an accounting document associated with an inventory change accounting notification; and
  the Demand Planning process component and the Demand Forecast Processing process component, where the interaction between the Demand Planning process component and the Demand Forecast Processing process component includes the transmission of:
    a product forecast notification message for maintaining demand forecast operations to create, update, or delete a demand forecast based on current and deleted forecasts included in the product forecast notification message; and
store the defined process components and service interface operations in memory.

2. The product of claim 1, wherein:
each of the plurality of process components is assigned to exactly one deployment unit among multiple deployment units, and each deployment unit is deployable on a separate computer hardware platform independent of every other deployment unit; and
all interaction between a process component in one deployment unit and any other process component in any other deployment unit takes place through the respective service interfaces of the two process components.

3. The product of claim 2, wherein the deployment units comprise:
a Financial Accounting deployment unit that includes the Accounting process component;
a Logistics Execution deployment unit that includes the Production process component, the Site Logistics process component, and the Confirmation and Inventory process component;
a Supply Chain Control deployment unit that includes the Customer Requirement Processing process component, the Demand Forecast Processing process component, the Supply and Demand Matching process component, the Production Trigger and Response process component, the In-house Requirement Processing process component, and the Sales Scheduling Agreement process component;
an Integrated Business Planning deployment unit that includes the Demand Planning process component.

4. The product of claim 1, wherein:
each of the process components includes one or more business objects; and
none of the business objects of any one of the process components interacts directly with any of the business objects included in any of the other process components.

5. The product of claim 4, wherein the business objects comprise a business process object.

6. The product of claim 4, wherein:
none of the business objects included in any one of the process components is included in any of the other process components.

7. The product of claim 1, further comprising:
a plurality of process agents, each process agent being either an inbound process agent or an outbound process agent, an inbound process agent being operable to receive a message from an inbound operation, an outbound process agent being operable to cause an outbound operation to send a message, each process agent being associated with exactly one process component.

8. The product of claim 7, wherein:
the inbound process agents comprise a first inbound process agent operable to start the execution of a step requested in a first inbound message by creating or updating one or more business object instances.

9. The product of claim 7, wherein:
the outbound process agents comprise a first asynchronous outbound process agent that is called after a business object that is associated with the first outbound process agent changes.

10. The product of claim 1, wherein the operations comprise synchronous and asynchronous operations.

11. A system, comprising:
a computer system comprising one or more hardware platforms for executing a computer software application, each hardware platform including at least one processor;
memory storing a plurality of process components executable by the respective processor of the particular hardware platform, each of the process components comprising a modular and application-independent package of reusable, granular software implementing a respective and distinct business process, the business process comprising functionality exposed by the process component via a corresponding service interface, the plurality of process components including:
  an Accounting process component for recording relevant business transactions;
  a Production process component for combining the activities required to manage the production execution process on the manufacturing shop floor;
  a Site Logistics process component for supporting preparing and execution tasks concerning internal inventory movements;
  a Confirmation and Inventory process component for combining tasks required to confirm inventory changes and provided activities;
  a Customer Requirement Processing process component for combining tasks required for processing customer requirements and provides an interface to pre-sales, sales and services;
  a Demand Forecast Processing process component for collecting demand forecasts for further processing;
  a Supply and Demand Matching process component for combining tasks necessary to ensure that sufficient material receipt elements exist to cover material demand while taking available capacity into account;
  a Production Trigger and Response process component for providing an interface to production from a supply planning perspective;
  an In-house Requirement Processing process component for combining tasks required for processing in-house requirements;

a Sales Scheduling Agreement Processing process component for combining tasks required for the inbound processing of delivery schedules and the outbound processing of delivery schedule confirmations; and a Demand Planning process component for combining all the tasks required to anticipate future demand; and a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, interactions between the process components including interactions between:

the Production process component and the Accounting process component, where the interaction between the Production process component and the Accounting process component includes the transmission of:

a production lot accounting notification message from the Production process component to the Accounting process component, the production lot accounting notification message causing the Accounting process component to inform accounting processing of a creation, change, or deletion to production orders;

an inventory change and activity confirmation accounting notification message from the Production process component to the Accounting process component, the inventory change and activity confirmation accounting notification message causing the Accounting process component to create an accounting document associated with the inventory change and activity; and an inventory change and activity confirmation cancellation accounting notification message from the Production process component to the Accounting process component, the inventory change and activity confirmation cancellation accounting notification message causing the Accounting process component to cancel a created accounting document associated with the inventory change and activity;

the Production Trigger and Response process component and the Production process component, where the interaction between the Production Trigger and Response process component and the Production process component includes the transmission of:

a production request message from the Production Trigger and Response process component to the Production process component, the production request message causing the Production process component to send an update request from planning to manufacturing to produce a certain quantity of a certain product at a certain time;

a production request confirmation message from the Production process component to the Production Trigger and Response process component, the production request confirmation message providing a confirmation of the production request to the Production Trigger and Response process component; and a production progress notification message from the Production process component to the Production Trigger and Response process component, the production progress notification message providing updates on a production request to the Production Trigger and Response process component;

the Site Logistics Processing process component and the Accounting process component, where the interaction between the Site Logistics Processing process component and the Accounting process component includes the transmission of:

an inventory change and activity confirmation accounting notification message from the Site Logistics Processing process component to the Accounting process component, the inventory change and activity confirmation accounting notification message requests the generation of an accounting document associated with an inventory change accounting notification; and an inventory change and activity Confirmation cancellation accounting notification message from the Site Logistics Processing process component to the Accounting process component, the inventory change and activity confirmation cancellation accounting notification message cancelling requests for the generation of an accounting document associated with an inventory change accounting notification; and the Demand Planning process component and the Demand Forecast Processing process component, where the interaction between the Demand Planning process component and the Demand Forecast Processing process component includes the transmission of:

a product forecast notification message for maintaining demand forecast operations to create, update, or delete a demand forecast based on current and deleted forecasts included in the product forecast notification message.

12. The system of claim 11, wherein:
each of the process components includes one or more business objects; and
none of the business objects of any one of the process components interacts directly with any of the business objects included in any of the other process components.

13. The system of claim 11, wherein:
none of the business objects included in any one of the process components is included in any of the other process components.

14. The system of claim 11, wherein:
a plurality of process agents, each process agent being either an inbound process agent or an outbound process agent, an inbound process agent being operable to receive a message from an inbound operation, an outbound process agent being operable to cause an outbound operation to send a message, each process agent being associated with exactly one process component.

15. The system of claim 11, the system comprising multiple hardware platforms, wherein:
the Accounting process component is deployed on a first hardware platform;
the Production process component, the Site Logistics process component, and the Confirmation and Inventory process component are deployed on a first hardware platform;
the Customer Requirement Processing process component, the Demand Forecast Processing process component, the Supply and Demand Matching process component, the Production Trigger and Response process component, the In-house Requirement Processing process component, and the Sales Scheduling Agreement process component are deployed on a first hardware platform; and the Demand Planning process component is deployed on a first hardware platform.

16. The system of claim 15, wherein each of the first through the last hardware platforms are distinct and separate from each other.

17. A computer-implemented method for developing a computer software application, the method comprising the following steps performed by one or more processors:

obtaining in a computer system digital data representing an architectural design for a set of processes implementing an end-to-end application process, the design specifying a process component for each process in the set of processes, each of the process components comprising a modular and application-independent package of reusable and granular software implementing a respective and distinct business process, the business process comprising functionality exposed by the process component, the design further specifying a set of process component interactions based on messages transmitted between two or more process components, wherein the specified process components include:
an Accounting process component for recording relevant business transactions;
a Production process component for combining the activities required to manage the production execution process on the manufacturing shop floor;
a Site Logistics process component for supporting preparing and execution tasks concerning internal inventory movements;
a Confirmation and Inventory process component for combining tasks required to confirm inventory changes and provided activities;
a Customer Requirement Processing process component for combining tasks required for processing customer requirements and provides an interface to presales, sales and services;
a Demand Forecast Processing process component for collecting demand forecasts for further processing;
a Supply and Demand Matching process component for combining tasks necessary to ensure that sufficient material receipt elements exist to cover material demand while taking available capacity into account;
a Production Trigger and Response process component for providing an interface to production from a supply planning perspective;
an In-house Requirement Processing process component for combining tasks required for processing in-house requirements;
a Sales Scheduling Agreement Processing process component for combining tasks required for the inbound processing of delivery schedules and the outbound processing of delivery schedule confirmations; and
a Demand Planning process component for combining all the tasks required to anticipate future demand; and wherein the process component interactions include interactions between:
the Production process component and the Accounting process component, where the interaction between the Production process component and the Accounting process component includes the transmission of:
a production lot accounting notification message from the Production process component to the Accounting process component, the production lot accounting notification message causing the Accounting process component to inform accounting processing of a creation, change, or deletion to production orders;
an inventory change and activity confirmation accounting notification message from the Production process component to the Accounting process component, the inventory change and activity confirmation accounting notification message causing the Accounting process component to create an accounting document associated with the inventory change and activity; and
an inventory change and activity confirmation cancellation accounting notification message from the Production process component to the Accounting process component, the inventory change and activity confirmation cancellation accounting notification message causing the Accounting process component to cancel a created accounting document associated with the inventory change and activity;
the Production Trigger and Response process component and the Production process component, where the interaction between the Production Trigger and Response process component and the Production process component includes the transmission of:
a production request message from the Production Trigger and Response process component to the Production process component, the production request message causing the Production process component to send an update request from planning to manufacturing to produce a certain quantity of a certain product at a certain time;
a production request confirmation message from the Production process component to the Production Trigger and Response process component, the production request confirmation message providing a confirmation of the production request to the Production Trigger and Response process component; and
a production progress notification message from the Production process component to the Production Trigger and Response process component, the production progress notification message providing updates on a production request to the Production Trigger and Response process component;
the Site Logistics Processing process component and the Accounting process component, where the interaction between the Site Logistics Processing process component and the Accounting process component includes the transmission of:
an inventory change and activity confirmation accounting notification message from the Site Logistics Processing process component to the Accounting process component, the inventory change and activity confirmation accounting notification message requests the generation of an accounting document associated with an inventory change accounting notification; and an inventory change and activity confirmation cancellation accounting notification message from the Site Logistics Processing process component to the Accounting process component, the inventory change and activity confirmation cancellation accounting notification message cancelling requests for the generation of an accounting document associated with an inventory change accounting notification; and the Demand Planning process component and the Demand Forecast Processing process component, where the interaction between the Demand Planning process component and the Demand Forecast Processing process component includes the transmission of:

a product forecast notification message for maintaining demand forecast operations to create, update, or delete a demand forecast based on current and deleted forecasts included in the product forecast notification message; and generating, using the at least one processor on the computer system, a computer software application to perform the set of processes based on the obtained design including the specified process components and the specified process component interactions.

18. The method of claim 17, wherein:

each process in the set of processes is a business process transforming a defined business input into a defined business outcome.

19. The method of claim 18, wherein:

obtaining digital data representing the architectural design further comprises editing the design before using the design.

* * * * *